(12) United States Patent
Minabe et al.

(10) Patent No.: US 7,952,975 B2
(45) Date of Patent: May 31, 2011

(54) OPTICAL REPRODUCTION DEVICE, OPTICAL RECORDING/REPRODUCTION DEVICE, AND OPTICAL REPRODUCTION METHOD

(75) Inventors: Jiro Minabe, Kanagawa (JP); Yasuhiro Ogasawara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 409 days.

(21) Appl. No.: 12/255,013

(22) Filed: Oct. 21, 2008

(65) Prior Publication Data
US 2009/0231650 A1 Sep. 17, 2009

(30) Foreign Application Priority Data
Mar. 17, 2008 (JP) ................................. 2008-068318

(51) Int. Cl.
*G11B 7/00* (2006.01)
(52) U.S. Cl. .................... 369/103; 369/124.04
(58) Field of Classification Search .................. None
See application file for complete search history.

(56) References Cited

U.S. PATENT DOCUMENTS

| | | | |
|---|---|---|---|
| 7,535,609 B2 * | 5/2009 | Yasuda et al. | 359/29 |
| 2007/0104069 A1 * | 5/2007 | Fukumoto et al. | 369/103 |
| 2007/0147801 A1 * | 6/2007 | Yasuda et al. | 386/126 |
| 2007/0268538 A1 * | 11/2007 | Ishioka et al. | 359/10 |
| 2008/0144147 A1 * | 6/2008 | Hara et al. | 359/3 |

FOREIGN PATENT DOCUMENTS

| | | |
|---|---|---|
| JP | 2006-301465 A | 11/2006 |
| JP | 2007-179595 A | 7/2007 |
| JP | 2007-179597 A | 7/2007 |

OTHER PUBLICATIONS

Masaaki Hara, et al.; "Linear Reproduction of a Holographic Storage Channel Using Coherent Addition of Optical DC Components"; International Symposium on Optical Memory 2007, Technical Digest; Oct. 21-25, 2007; pp. 36-37; ISOM Secretariat c/o Adthree Publishing Co., Ltd.

* cited by examiner

*Primary Examiner* — Paul Huber
(74) *Attorney, Agent, or Firm* — Sughrue Mion, PLLC

(57) ABSTRACT

There is provided an optical reproduction device that reproduces a hologram that is recorded on an optical recording medium by interference between a signal light and a reference light coaxial to the signal light. The device has: a coherent light source; a light distribution unit distributing light from the light source, to a signal light optical path and a reference light optical path; a spatial light modulator that includes a signal light region and a reference light region, a spatial light modulator, a first irradiation optical system spatially separating light distributed to the reference light optical path and light distributed to the signal light optical path, making optical axes of both lights coincide, and irradiating the both lights onto the spatial light modulator; and a second irradiation optical system irradiating reference light onto the optical recording medium as reading light, and reproducing the hologram.

11 Claims, 11 Drawing Sheets

# OPTICAL REPRODUCTION DEVICE, OPTICAL RECORDING/REPRODUCTION DEVICE, AND OPTICAL REPRODUCTION METHOD

CROSS-REFERENCE TO RELATED APPLICATION

This application is based on and claims priority under 35 USC 119 from Japanese Patent Application No. 2008-068318 filed on Mar. 17, 2008.

BACKGROUND

1. Technical Field

The present invention relates to an optical reproduction device, an optical recording/reproduction device and an optical reproduction method.

2. Related Art

In recent years, a coaxial recording system (co-linear system) has been proposed as a holographic memory recording/reproduction system. As compared with a conventional two-beam interference system, the co-linear system has the advantages such that the optical system can be greatly simplified, the co-linear system is strong with respect to external disturbances such as vibrations, and introduction of a servo mechanism is easy. In this co-linear system, signal light and reference light, that are modulated and generated by a spatial light modulator, are collected by a same lens and with their optical axes being in common, and the interference fringes (diffraction grating) formed by the interference between the signal light and the reference light are recorded on an optical recording medium as a hologram.

By displaying a signal light pattern, that two-dimensionally encodes digital data, on a spatial light modulator, the digital data is superimposed on the signal light. By irradiating reference light as reading light onto an optical recording medium on which a hologram is recorded, the signal light is reproduced from the recorded hologram. The superimposed digital data can be decoded from the reproduced signal light.

On the other hand, there is proposed a reproduction method (hereinafter called the "negative/positive reproduction method") in which, by adding a DC component to reproduced light at the time of reproduction of a hologram, two reproduced images that are a negative image and a positive image are generated from one hologram, and by determining the difference between the both, the signal-to-noise ratio (SNR) is improved. Further, there is proposed a technique (hereinafter called the "coherent addition method") in which recording is carried out by providing a phase difference of 0 and $\pi$ to the on pixels by using two spatial light modulators in order to provide a phase difference, and at the time of reproduction, by adding a DC component of a phase difference of $\pi/2$ and causing interference, the interference between the pixels of the reproduced data page is made to have a linear characteristic, and the SNR is improved.

All of these techniques are to improve the SNR, and all of these techniques cause interference between the high-order component of the reproduced diffraction light and the DC component added at the time of reproduction, and obtain a new reproduced image. The DC component that is added is generated in the signal light region of the spatial light modulator that is a liquid crystal display (LCD) or the like. However, it is difficult to control at the same time both the phase and the amplitude (light intensity) of the "added DC component" merely by a spatial light modulator. Usually, controlling of the phase of the "added DC component" is carried out by a spatial light modulator. Accordingly, a structure that, independently of the phase, controls the amplitude of the "added DC component" is required separately from the spatial light modulator.

Further, in a form in which light from a light source is made incident as is onto a spatial light modulator at which a signal light region and a reference light region are formed, when reference light is irradiated as reading light at the time of reproduction, light leaks out also from the signal light region of the spatial light modulator. For example, when the precision of the liquid crystal elements that are disposed as a transmission-type spatial light modulator is low, there are cases in which the light that is transmitted through the off pixels at the displayed position of the signal light pattern becomes unnecessary leakage light and is detected at a light detector, and generates noise with respect to the reproduced signal light.

SUMMARY

One aspect of the present invention is an optical reproduction device that reproduces a hologram which is recorded on an optical recording medium by interference between a signal light and a reference light coaxial to the signal light, the device including: a light source that emits coherent light; a light distribution unit that distributes the coherent light emitted from the light source to a signal light optical path and a reference light optical path; a spatial light modulator including plural pixels arrayed two-dimensionally, a signal light region that displays a signal light pattern when generating signal light, and a reference light region that displays a reference light pattern when generating reference light coaxial to the signal light, the spatial light modulator modulating and outputting incident light for each pixel in accordance with a displayed pattern; a first irradiation optical system that spatially separates light distributed to the reference light optical path and light distributed to the signal light optical path, makes optical axes of both lights coincide, and irradiates both lights onto the spatial light modulator; and a second irradiation optical system that irradiates the reference light generated at the reference light region of the spatial light modulator onto the optical recording medium as a reading light, and reproduces signal light that is recorded in the hologram.

BRIEF DESCRIPTION OF THE DRAWINGS

Exemplary embodiments of the present invention will be described in detail based on the following figures, wherein.

DETAILED DESCRIPTION

Examples of exemplary embodiments of the present invention will be described in detail hereinafter with reference to the drawings.

First Exemplary Embodiment

Schematic Structure of Optical Recording/Reproduction Device

Figure 1:
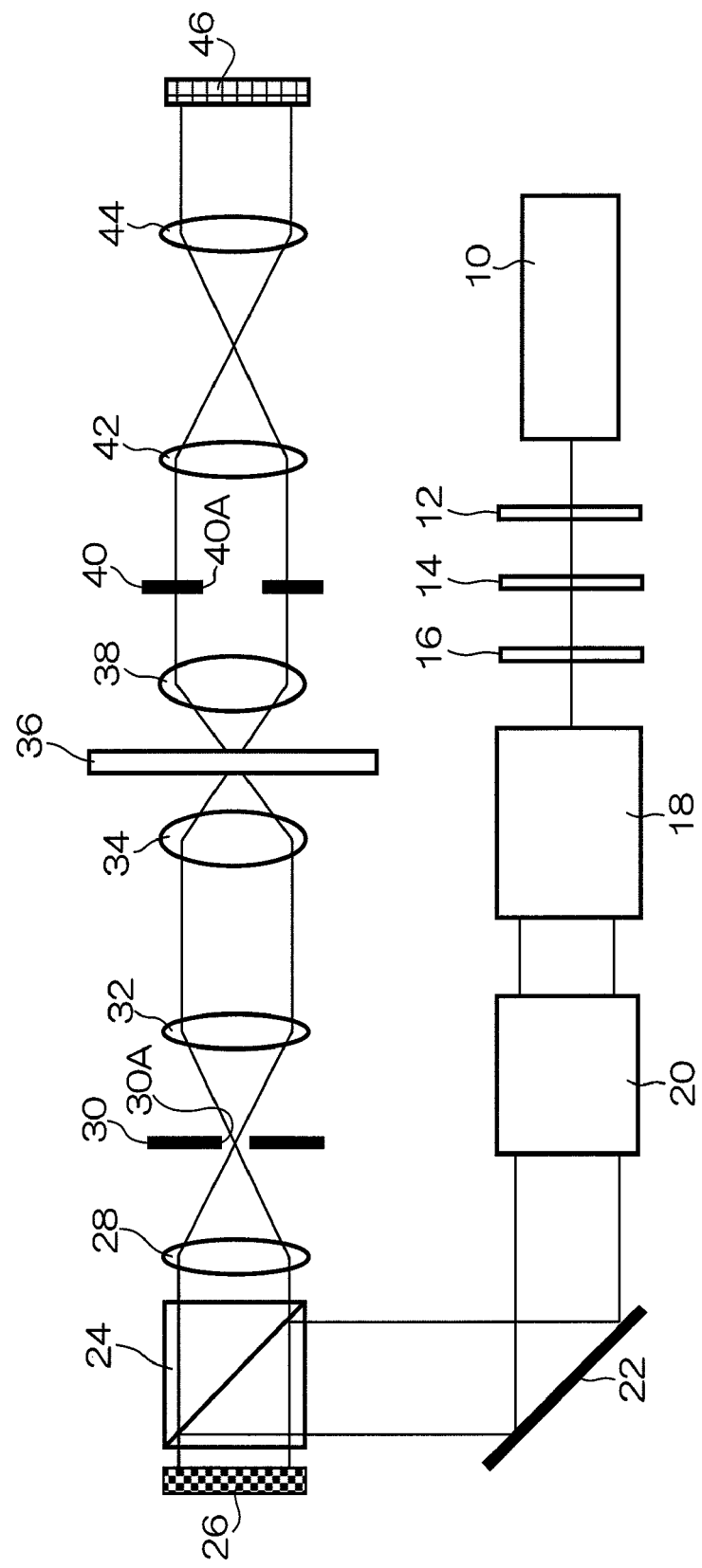
FIG. 1 is a schematic view showing the structure of an optical recording/reproduction device relating to an exemplary embodiment of the present invention.

FIG. 1 is a schematic view showing the structure of an optical recording/reproduction device relating to an exemplary embodiment of the present invention. This optical recording/reproduction device is a "coaxial recording system (co-linear system)" optical recording/reproduction device that irradiates signal light and reference light, that have a common optical axis, as one beam of recording light from the same direction onto an optical recording medium. In the present exemplary embodiment, explanation is given of a "coaxial transmission-type" optical recording/reproduction device that uses a reflection-type spatial light modulator (SLM) and a transmission-type optical recording medium.

A light source 10, that oscillates (emits) laser light that is coherent light, is provided at the optical recording/reproduction device. A laser light source that emits, for example, green laser light of an oscillation wavelength of 532 nm can be used as the light source 10. A shutter 12 that can be inserted into or withdrawn from the optical path (open and close), a half-wave plate 14 that provides a phase difference of ½ wavelength to two orthogonal linearly polarized light components, a polarizing plate 16 that transmits light of a predetermined polarization direction, a beam expander 18 that is an expanding/collimating optical system, an axicon optical system 20 that includes a light distribution unit, a beam shaping unit and an optical axis aligning unit, and a reflecting mirror 22 are disposed at the light emitting side of the light source 10, along the optical path in that order from the light source 10.

The light source 10 is connected to a controller (not shown) via a driving device (not shown), and is driven by the driving device (not shown) in accordance with control signals. Further, the shutter 12 is connected to the controller (not shown) via a driving device (not shown), and is driven to open and close by the driving device (not shown) in accordance with control signals.

A polarization beam splitter 24, that reflects light of a predetermined polarization direction and transmits light of the polarization direction orthogonal thereto, is disposed at the light reflecting side of the reflecting mirror 22. A reflection-type spatial light modulator 26, that is equipped with a large number of pixel portions and polarizes and modulates incident light for each pixel, is disposed at the light-reflecting side of the polarization beam splitter 24, as seen from the reflecting mirror 22. Liquid Crystal on Silicon (LCOS) or the like, at which phase modulation and polarization modulation are possible, can be used as the reflection-type spatial light modulator 26. The spatial light modulator 26 is connected to the controller (not shown) via a pattern generator (not shown).

The pattern generator expresses digital data, that is supplied from the controller, in a form of a light/dark image (image expressed by intensity distribution), and generates a signal light pattern that is to be displayed at the spatial light modulator 26. The signal light pattern is a digital pattern in which, for example, binary digital data "0, 1" are expressed by "dark (black pixel), light (white pixel)". In addition to the signal light pattern, a reference light pattern is also displayed on the spatial light modulator 26. The reference light pattern is, for example, a random pattern. The spatial light modulator 26 modulates the incident laser light in accordance with the displayed signal light pattern and reference light pattern, and generates signal light and reference light. Further, in a case in which reproduction is carried out by adding a DC component, the spatial light modulator 26 generates the DC component to be added. The spatial light modulator 26 reflects the generated light such as signal light and reference light toward the polarization beam splitter 24.

Figure 5B:
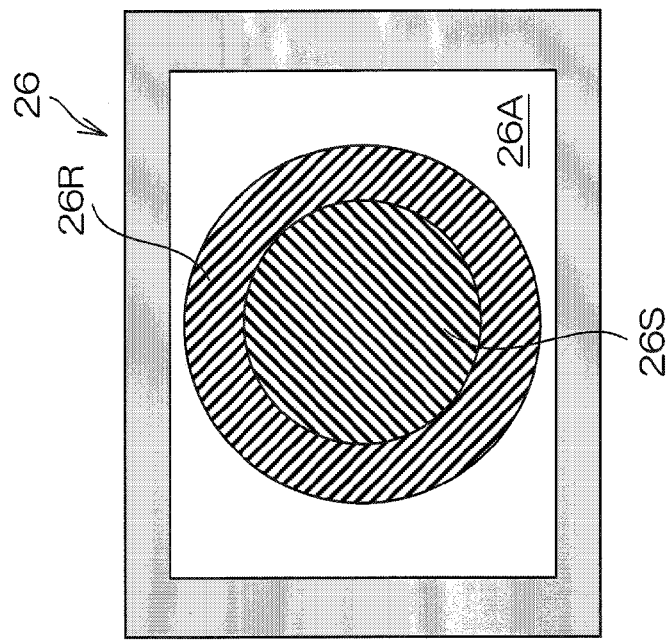
FIG. 5B is a plan view showing an example of a display region that is set at a display surface of the spatial light modulator.
Figure 5A:
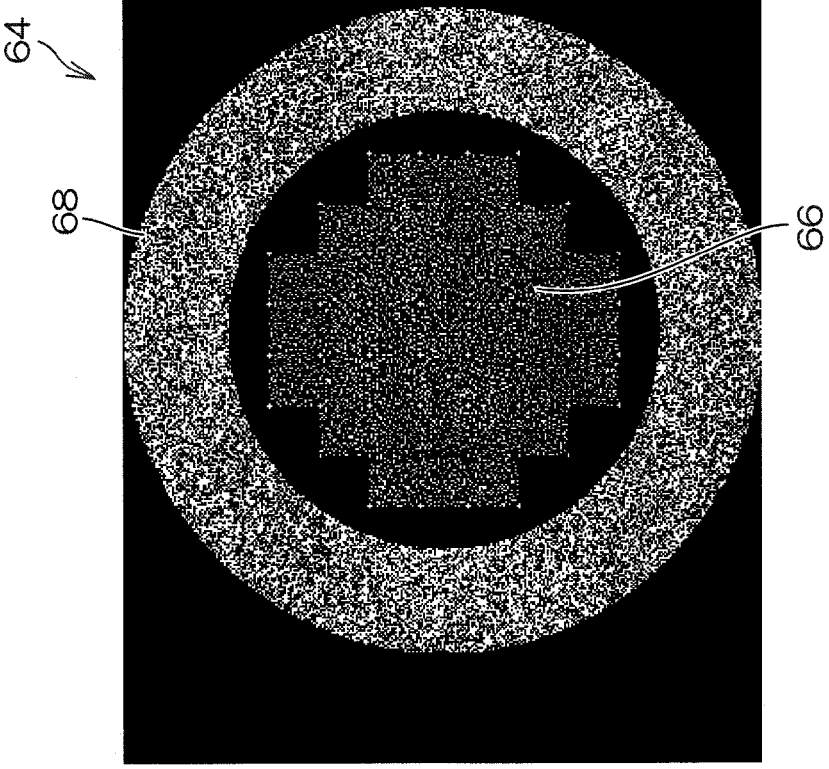
FIG. 5A is a drawing showing an example of a pattern for recording that is displayed on a spatial light modulator at a time of recording.

FIG. 5A shows an example of a pattern for recording (recording pattern) that is displayed on the spatial light modulator 26 in recording process. As shown in FIG. 5A, a pattern 64 for recording is structured to include a signal light pattern 66 that generates signal light, and a ring-shaped reference light pattern 68 that generates reference light. The signal light pattern 66 is displayed at the central portion of the spatial light modulator 26. The reference light pattern 68 is displayed at the peripheral portion of the spatial light modulator 26 so as to surround the signal light pattern. The region that displays the signal light pattern is a signal light region, and the region that displays the reference light pattern is a reference light region. The shape of the signal light region and the shape of the reference light region can be changed appropriately in accordance with the pattern 64 for recording.

FIG. 5B is a plan view showing an example of the display region that is set at a display surface 26A of the spatial light modulator 26. The size of the recording pattern is set in advance in accordance with, for example, the size of the display surface 26A. In the exemplary embodiment, as shown in FIG. 5B, a circular signal light region 26S and a ring-shaped reference light region 26R that surrounds the signal light region 26S, are respectively disposed at the display surface 26A of the spatial light modulator 26.

At the time of reproduction, a pattern for reproduction (reproduction pattern) is displayed at the display surface 26A of the spatial light modulator 26. When the reference light is irradiated as reading light to reproduce the signal light recorded in the hologram, the reference light pattern is displayed only at the reference light region 26R of the spatial light modulator 26. In accordance with the displayed reference light pattern, the incident laser light is modulated, and ideally, only the reference light is generated. However, as described above, in a case such as the precision of the spatial light modulator is low, there are cases in which unnecessary leakage light is generated at the signal light region.

Further, in a reproduction method in which a DC component is added to diffraction light, such as the aforementioned "negative/positive reproduction method" or "coherent addition method", the reference light pattern is displayed at the reference light region 26R to generate reference light, and a transmission pattern of a predetermined luminance is displayed at the signal light region 26S to generate the DC component to be added. As described above, it is difficult to control both the amplitude and the phase of the DC component to be added. Therefore, there are cases in which the amplitude of the DC component to be added becomes large and a component that is excessive as compared to the DC component that should be added arises (i.e., unnecessary leakage light arises).

The axicon optical system 20 generates, separately and in accordance with the shapes of the respective regions, parallel light to be irradiated onto the signal light region 26S and parallel light to be irradiated onto the reference light region 26R. Also, the light amount can be adjusted for each of the regions. In the exemplary embodiment, in order to irradiate laser light onto the circular signal light region 26S, the axicon optical system 20 generates parallel light at which the cross-sectional shape in a direction orthogonal to the optical axis is circular (hereinafter called "circular parallel light"). Further, in order to irradiate laser light onto the ring-shaped reference light region 26R that surrounds the signal light region 26S, the axicon optical system 20 generates parallel light at which the cross-sectional shape in a direction orthogonal to the optical axis is ring-shaped (hereinafter called "ring-shaped parallel light").

Although the axicon optical system 20 will be described in detail later, in the exemplary embodiment, the unnecessary leakage light generated at the signal light region in reproduction process is reduced by using the axicon optical system 20. Here, unnecessary leakage light generated at the signal light region in reproduction process means light that originally should not be irradiated onto the optical recording medium from the signal light region of the spatial light modulator. For example, when carrying out reproduction by using reference light as the reading light as usual, the light that arises from the signal light region of the spatial light modulator corresponds to unnecessary leakage light. Further, in reproduction methods such as the aforementioned "negative/positive reproduction method" and "coherent addition method", the component that is excessive as compared with the DC component that should be added corresponds to the unnecessary leakage light.

Light beams such as the signal light and the reference light that are generated at the spatial light modulator 26 are incident on the polarization beam splitter 24. A pair of lenses 28, 32 and a Fourier transform lens 34 are disposed in that order along the optical path at the light transmitting side of the polarization beam splitter 24, as seen from the spatial light modulator 26. The Fourier transform lens 34 Fourier-transforms the recording light, and irradiates it onto an optical recording medium 36. The focal position of the Fourier transform lens 34 is the light collecting position at which the recording light is collected. Further, a light-shielding plate 30 having an opening (aperture) 30A is disposed in a vicinity of the beam waist between the lens 28 and the lens 32. Note that the light-shielding plate 30 is not essential, and can be appropriately omitted.

A holding stage (not shown) that holds the optical recording medium 36 is provided at the light exiting side of the Fourier transform lens 34. The holding stage is driven by a driving device (not shown) that is connected to the controller (not shown), and moves in the direction of the optical axis or in the direction of the plane perpendicular to the optical axis. The holding stage holds the optical recording medium 36 at a reference position which is such that, for example, the central position in the direction of film thickness of the optical recording medium 36 is the focal position of the Fourier transform lens 34.

The optical recording medium 36 is an optical recording medium that can record a hologram by changes in the refractive index due to the irradiation of light. Optical recording media using recording materials such as, for example, photopolymer materials, photorefractive materials, or silver salt photosensitive materials are examples of the optical recording medium 36.

A Fourier transform lens 38, a pair of lenses 42, 44, and a sensor array 46 are disposed at the light transmitting side of the optical recording medium 36. The sensor array 46 is structured by imaging elements such as a CCD or CMOS array, and converts the reproduced light (diffraction light) that is received into electrical signals and outputs the electrical signals. A light-shielding plate 40 having an opening (aperture) 40A of a large diameter is disposed between the lens 38 and the lens 42. Note that the light-shielding plate 40 is not essential, and can be appropriately omitted. The sensor array 46 is connected to the controller (not shown). In the reproduction process, the sensor array 46 captures the reproduced image that is imaged at the light-receiving surface, and outputs the captured image data to the controller (not shown).

Structure of Axicon Optical System

Figure 2:
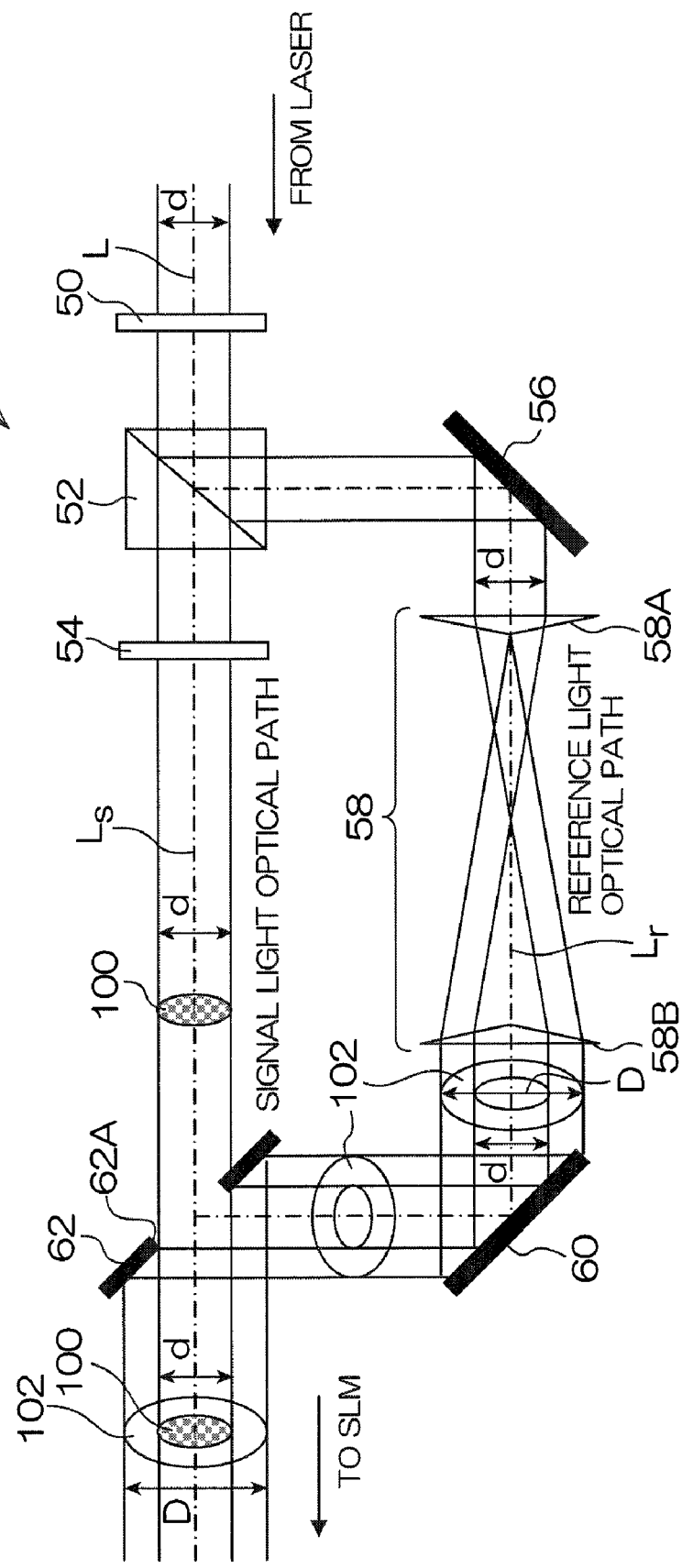
FIG. 2 is a schematic view showing the structure of an axicon optical system.

The structure of the axicon optical system 20 relating to the first exemplary embodiment will be described next. FIG. 2 is a schematic view showing an example of the structure of the axicon optical system. The axicon optical system 20 is structured to include a half-wave plate 50, a polarization beam splitter 52, a half-wave plate 54, a reflecting mirror 56, a pair of axicon lenses 58 that convert a circular beam into a ring-shaped beam, a reflecting mirror 60, and a reflecting mirror 62 that is shaped as an elliptical ring. Laser light is incident on the axicon optical system 20 from the beam expander 18. The half-wave plate 50 and the polarization beam splitter 52 are disposed in that order along the optical path from the laser light incident side. The half-wave plate 50 functions as a light amount adjusting unit that adjusts the light amount balance of the two distributed light beams. Details thereof will be described later.

The polarization beam splitter 52 distributes the incident laser light to a signal light optical path and a reference light optical path. The half-wave plate 54 is disposed at the light transmitting side of the polarization beam splitter 52 (i.e., at the signal light optical path). On the other hand, the reflecting mirror 56 is disposed at the light reflecting side of the polarization beam splitter 52 (i.e., at the reference light optical path). The pair of axicon lenses 58 and the reflecting mirror 60 are disposed in that order along the optical path at the light reflecting side of the reflecting mirror 56. The reflecting mirror 62 shaped as an elliptical ring and provided with an opening 62A, is disposed at the light reflecting side of the reflecting mirror 60. Note that, as will be described later, the elliptical-ring-shaped reflecting mirror 62 functions as an optical axis aligning unit that reflects ring-shaped parallel light 102 generated at the reference light optical path, and aligns the optical axis thereof with that of circular parallel light 100 generated at the signal light optical path.

Figure 3:
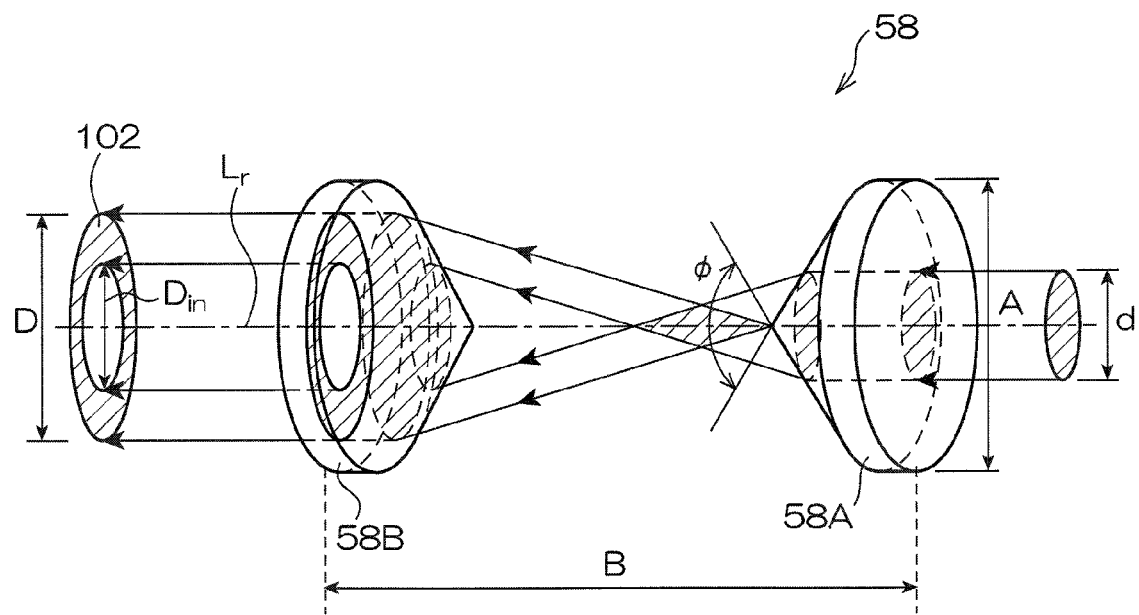
FIG. 3 is a drawing showing how a pair of axicon lenses converts a circular beam into a ring-shaped beam.

FIG. 3 is a drawing showing how the pair of axicon lenses 58 convert a circular beam into a ring-shaped beam. Namely, the pair of axicon lenses 58 function as a beam shaping unit that shapes the incident beam. The pair of axicon lenses 58 are structured by an axicon lens 58A and an axicon lens 58B that have the same shape. An axicon is an optical element that has axially symmetrical surfaces and that converts light from a point light source into a rectilinear image on the optical axis. An axicon is usually used in the form of a conical lens having a conical surface. A conical lens at which one surface is a flat surface and another surface is a conical surface is generally called an axicon lens. In the exemplary embodiment as well, the conical lenses shown in FIG. 3 are called axicon lenses.

The cone axes of the axicon lens 58A and the axicon lens 58B coincide with the optical axis (optical axis $L_r$ in FIG. 3) (i.e., the respective vertices of the cones are positioned on the same optical axis). The axicon lens 58A and the axicon lens 58B are disposed so as to be spaced from one another by a predetermined distance such that the conical surfaces thereof oppose one another. When parallel light of a predetermined diameter (diameter d in FIG. 3) is incident from the flat surface of the axicon lens 58A, when the incident light exits from the inclined surface and the vertex of the conical surface, the light is collected in the shape of a ring, and a ring-shaped beam is formed. The ring-shaped beam is incident from the conical surface of the axicon lens 58B, and is made into the ring-shaped parallel light 102, and exits from the flat surface of the axicon lens 58B.

Note that, in the exemplary embodiment, two lenses of the same shape are used as the axicon lens 58A and the axicon lens 58B. However, the ring-shaped parallel light 102 can be also obtained similarly when two axicon lenses, whose angles of inclination of the conical surfaces and whose refractive indices are equal, are used in combination.

An outer diameter (diameter of the outer periphery) D and an inner diameter (diameter of the inner periphery) $D_{in}$ of the generated ring-shaped parallel light 102 are determined in accordance with the diameter d of the incident parallel light, a diameter A of the axicon lenses, an angle $\phi$ of the vertex angles of the conical portions of the axicon lenses, and a spacing distance B between the pair of axicon lenses. The spacing distance B is the distance from the flat surface of the axicon lens 58A to the flat surface of the axicon lens 58B.

In the exemplary embodiment, the outer diameter D and the inner diameter $D_{in}$ of the ring-shaped parallel light 102 are designed in accordance with the shape of the reference light region 26R of the spatial light modulator 26. Namely, they are designed such that the outer diameter D is equal to the outer diameter of the reference light region 26R, and the inner diameter $D_{in}$ is equal to the inner diameter of the reference light region 26R. Due to this configuration, the ring-shaped parallel light 102 can be irradiated exactly onto the reference light region 26R shown in FIG. 5B. Further, in the exemplary embodiment, explanation will be given with the inner diameter of the reference light region 26R and the diameter of the signal light region 26S being equal, and the inner diameter $D_{in}$ of the ring-shaped parallel light 102 being equal to the diameter d of the circular parallel light 100.

Note that the inner diameter of the reference light region 26R may be made to be larger than the diameter of the signal light region 26S, from the standpoint of reducing the unnecessary leakage light generated at the signal light region in the reproduction process. Namely, the inner diameter $D_{in}$ of the ring-shaped parallel light 102 may be made to be slightly larger than the inner diameter of the reference light region 26R.

Figure 4:
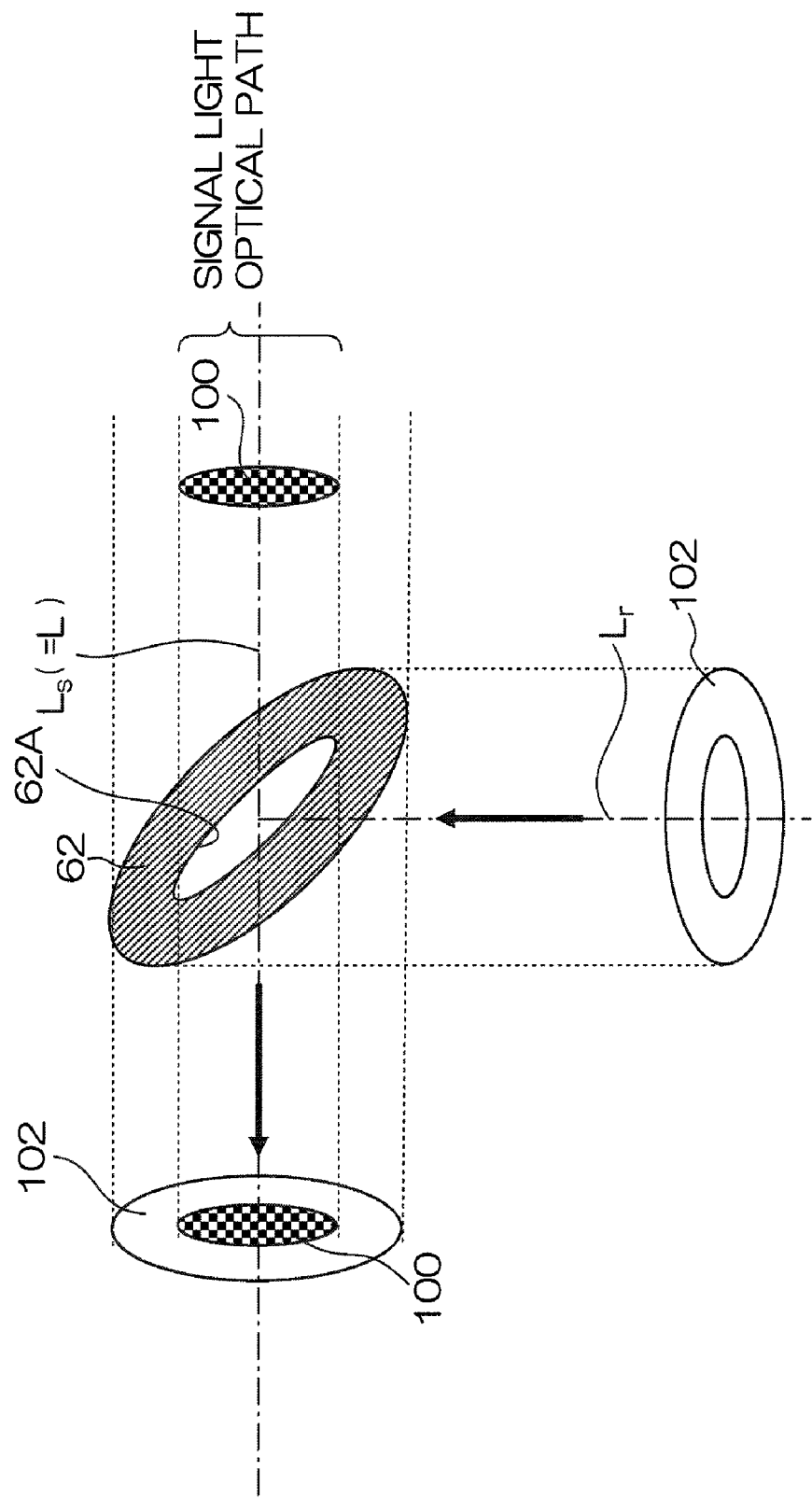
FIG. 4 is a drawing showing that an elliptical-ring-shaped reflecting mirror functions as an optical axis aligning unit.

FIG. 4 is a drawing showing how the elliptical-ring-shaped reflecting mirror 62 functions as an optical axis aligning unit. The elliptical-ring-shaped reflecting mirror 62 is disposed at the outer side of the signal light optical path, such that the circular parallel light 100 generated at the signal light optical path can pass through the opening 62A thereof. Further, the elliptical-ring-shaped reflecting mirror 62 is disposed so as to be inclined at a predetermined angle (here, 45°) with respect to an optical axis $L_s$, such that the optical axis $L_r$ of the ring-shaped parallel light 102 generated at the reference light optical path and the optical axis $L_s$ (=L) of the circular parallel light 100 generated at the signal light optical path coincide. Due to this configuration, the ring-shaped parallel light 102 generated at the reference light optical path is reflected at the elliptical-ring-shaped reflecting mirror 62, and the optical path thereof is bent (90° here), and the optical axis is made to coincide with that of the circular parallel light 100 generated at the signal light optical path. Namely, the circular parallel light 100 and the ring-shaped parallel light 102 become a coaxial single beam.

Operation of Axicon Optical System

The operation of the axicon optical system 20 illustrated in FIG. 2 will be described next. Circular parallel light of the diameter d is incident on the axicon lens system 20 from the beam expander 18. At the half-wave plate 50, this circular parallel light of the diameter d becomes polarized light having a desired polarization plane, and is incident on the polarization beam splitter 52. The polarization beam splitter 52 reflects the light of a predetermined polarization direction, and transmits the light of the polarization direction orthogonal thereto. The polarized component transmitted through the polarization beam splitter 52 is distributed to the signal light optical path as circular parallel light of the diameter d. The polarized component that is reflected at the polarization beam splitter 52 is distributed to the reference light optical path as circular parallel light of the diameter d.

The light intensity ratio (light amount balance) of the light distributed to the signal light optical path and the reference light optical path can be adjusted by adjusting the half-wave plate 50. For example, the exemplary embodiment may be structured such that the polarization beam splitter 52 transmits P-polarized light and reflects S-polarized light. By controlling the polarization direction of the laser light by the half-wave plate 50, the ratio of the P-polarized component and the S-polarized component that are incident on the polarization beam splitter 52 can be changed. The light intensity ratio of the P-polarized light distributed to the signal light optical path and the S-polarized light distributed to the reference light optical path can be thereby adjusted.

Such a structure also makes it possible to lead the majority of the light from the light source to the reference light optical path. The reference light is generated from the light that is distributed to the reference light optical path. When the amount of light that is used as the reference light is made to be large, it is easy to ensure a sufficient reference light intensity even if the reference light region 26R shown in FIG. 5B is made to be narrow. As a result, as compared with conventional structures, the signal light region 26S can be widened, and thereby, the recording capacity of the data page can be increased.

Further, in the exemplary embodiment, the half-wave plate 50 is adjusted such that, in recording process, light is distributed to both the signal light optical path and the reference light optical path, and, in reproduction process, light is distributed only to the reference light optical path. Accordingly, in the reproduction process, only the ring-shaped parallel light 102 is generated at the reference light optical path, and the generated ring-shaped parallel light 102 is irradiated only onto the reference light region 26R of the spatial light modulator 26 shown in FIG. 5B. Namely, light is not irradiated onto the signal light region 26S shown in FIG. 5B, and in the reading light irradiated onto the hologram, the unnecessary leakage light (unnecessary component) generated at the signal light region is greatly reduced, and the reproduction characteristic improves. Further, in the reproduction process, the laser power from the light source 10 is used only for generating reference light, and therefore, the efficiency of utilization of light in the reproduction process improves. In accordance therewith, the intensity of the reproduced light becomes large, and improvement in the reproduction speed can be also expected.

Note that, in a case in which reproduction is carried out by adding a DC component of the signal light in the reproduction process, such as in the aforementioned "coherent addition method" or "negative/positive reproduction method", the half-wave plate 50 can be adjusted such that an appropriate light amount is distributed to the signal light optical path as the amount of the DC component that should be added. Here, the amount of the DC component that should be added (i.e., the amplitude of the DC component) is determined in accordance with the DC component ratio of the signal light (the ratio of the DC component and the high-order component) and the diffraction efficiency. These reproduction methods are for improvement of the SNR by controlling the phase difference between the diffraction light and the DC component that is made to interfere with the diffraction light. Accordingly, it suffices to determine the amplitude of the DC component such that the amplitude (intensity) of the high-order component after interference is detected accurately by effectively utilizing the dynamic range of the light detector.

As described above, the DC component to be added is generated at the signal light region of the spatial light modulator that is an LCD or the like. However, it is difficult to control both the phase and the amplitude (light intensity) of the "DC component to be added" only by a spatial light modulator at the same time. Generally, phase modulation is carried out at a spatial light modulator, but when the phase is modulated, the intensity of the light transmitted through the polarization beam splitter also changes. In contrast, in the device structure relating to the exemplary embodiment, independently of the phase that the spatial light modulator 26 (here, the LCOS) gives, the light intensity of the DC component can be adjusted by the half-wave plate 50 that is disposed at the light incident side of the polarization beam splitter 52. Therefore, also when reproduction is carried out by adding a DC component, both the phase and the amplitude (the light intensity) of the "DC component to be added" can be controlled.

The polarized component that is transmitted through the polarization beam splitter 52 (the P-polarized component) is distributed to the signal light optical path as described above. At the circular parallel light of the diameter d distributed to the signal light optical path, a phase difference of ½ wavelength is again applied by the half-wave plate 54 to the orthogonal linearly polarized components (i.e., linearly polarized components orthogonal to the optical axis of the half-wave plate 54), such that the polarization direction is adjusted to become the same as that of the reference light (i.e., P-polarized light is converted to S-polarized light). In this way, the circular parallel light 100 (S-polarized light) is generated at the signal light optical path. The circular parallel light 100 is guided through the signal light optical path at the uniform diameter d. In the exemplary embodiment, the diameter d of the circular parallel light 100 is designed to be equal to the diameter of the signal light region 26S, so as to be exactly irradiated onto the signal light region 26S shown in FIG. 5B. The circular parallel light 100 generated at the signal light optical path passes through the opening 62A of the reflecting mirror 62.

On the other hand, the polarized component that is reflected at the polarization beam splitter 52 (the S-polarized component) is distributed to the reference light optical path as described above. The circular parallel light of the diameter d that is distributed to the reference light optical path is reflected at the reflecting mirror 56, and is incident on the axicon lens 58A. As described above, the circular parallel light of the diameter d, that is incident from the flat surface side of the axicon lens 58A, is collected into a ring-shape by the axicon lens 58A, and is made into parallel light by the axicon lens 58B. Then, the ring-shaped parallel light 102 (S-polarized light), whose outer diameter is D and whose inner diameter is d, exits from the flat surface of the axicon lens 58B.

The ring-shaped parallel light 102 that exits from the axicon lens 58B is reflected at the reflecting mirror 60 such that the optical path thereof is bent in the direction of the signal light optical path, and is irradiated onto the elliptical-ring-shaped reflecting mirror 62. The ring-shaped parallel light 102 is reflected at the reflecting mirror 62 such that the optical path thereof is bent again, and the optical axis thereof is made to coincide with that of the circular parallel light 100 generated at the signal light optical path.

As described above, the axicon optical system 20 distributes the incident circular parallel light to the signal light optical path and the reference light optical path, and generates the circular parallel light 100 at the signal light optical path, and the ring-shaped parallel light 102 at the reference light optical path. The circular parallel light 100 generated at the signal light optical path and the ring-shaped parallel light 102 generated at the reference light optical path are then aligned such that the optical axes thereof coincide. The circular parallel light 100 and the ring-shaped parallel light 102, whose optical axes coincide, exit from the axicon optical system 20.

As will be described later, the parallel light that exits from the axicon optical system 20 is reflected at the reflecting mirror 22 and the polarization beam splitter 24, and is irradiated onto the spatial light modulator 26. At this time, the circular parallel light 100 generated at the signal light optical path is irradiated onto the signal light region 26S, and the ring-shaped parallel light 102 generated at the reference light optical path is irradiated onto the reference light region 26R (refer to FIG. 6A).

Recording/Reproduction Operations of Optical Recording/Reproduction Device

Next, the recording/reproduction operations of the optical recording/reproduction device shown in FIG. 1 will be described.

When recording a hologram, the shutter 12 is opened, and laser light is emitted from the light source 10. Simultaneously, a recording pattern is displayed on the spatial light modulator 26. The laser light emitted from the light source 10 passes through the shutter 12, and the light intensity and polarization direction thereof are adjusted by the half-wave plate 14 and the polarizing plate 16. The light that is transmitted through the polarizing plate 16 is converted into parallel light of a large diameter by the beam expander 18, and is made incident on the axicon optical system 20.

At the axicon optical system 20, the circular parallel light 100 irradiated onto the signal light region 26S and the ring-shaped parallel light 102 irradiated onto the reference light region 26R are generated from the incident circular parallel light. The optical axes of the generated circular parallel light 100 and ring-shaped parallel light 102 are aligned by the axicon optical system 20. The circular parallel light 100 and the ring-shaped parallel light 102 that have a common optical axis, exit from the axicon optical system 20.

Figure 6A:
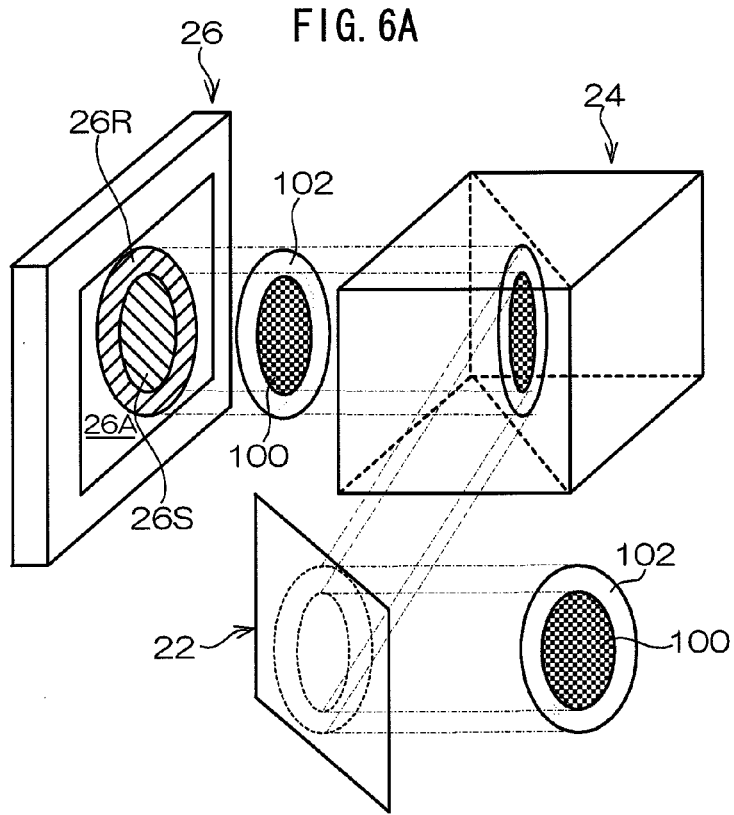
FIG. 6A is a perspective view showing a situation in which laser light is irradiated onto the display surface of the spatial light modulator at a time of recording.

As shown in FIG. 6A, the parallel light 100 and the parallel light 102 that exit from the axicon optical system 20 are irradiated onto the reflecting mirror 22. The parallel light 100 and the parallel light 102 that are reflected by the reflecting mirror 22 are incident on the polarization beam splitter 24. In the exemplary embodiment, the polarization beam splitter 24 reflects S-polarized light and transmits P-polarized light. The incident parallel light 100 and parallel light 102 (S-polarized light) are reflected in the direction toward the spatial light modulator 26 by the polarization beam splitter 24. At this time, a recording pattern is displayed on the spatial light modulator 26. At the spatial light modulator 26, the laser light is polarized and modulated in accordance with the displayed pattern (S-polarized light is converted to P-polarized light), and signal light and reference light are generated.

In the exemplary embodiment, as shown in FIG. 6A, the circular parallel light 100 generated at the axicon optical system 20 is irradiated onto the signal light region 26S of the spatial light modulator 26, and the ring-shaped parallel light 102 generated at the axicon optical system 20 is irradiated onto the reference light region 26R of the spatial light modulator 26. The laser light incident on the signal light region 26S is polarized and modulated in accordance with the displayed signal light pattern, and signal light is generated. Further, the laser light incident on the reference light region 26R is polarized and modulated in accordance with the displayed reference light pattern, and reference light is generated.

The recording light that is polarized and modulated at the spatial light modulator 26 is irradiated onto the polarization beam splitter 24, is transmitted through the polarization beam splitter 24, and is converted into an amplitude distribution of linearly polarized light (P-polarized light). Thereafter, the light is collected at the lens 28, and is irradiated onto the light-shielding plate 30 that has the aperture 30A. The unnecessary frequency component of the recording light collected at the lens 28 is cut at the light-shielding plate 30, and the remainder passes through the aperture 30A. The recording light that passes through the aperture 30A is converted into parallel light by the lens 32.

The recording light converted into parallel light by the lens 32, i.e., the signal light and the reference light, is Fourier-transformed and collected by the Fourier transform lens 34, and is irradiated simultaneously and coaxially onto the optical recording medium 36. At the position where the signal light and the reference light are collected, the interference fringes formed by the signal light and the reference light interfering are recorded as a hologram on the optical recording medium 36.

In a case of reading the data recorded on the optical recording medium 36 (i.e., reproduction process), the shutter 12 is opened, and laser light is irradiated from the light source 10. Simultaneously, a reproduction pattern is displayed on the spatial light modulator 26. In the same way as in the recording process, the laser light emitted from the light source 10 passes through the shutter 12, and the light intensity and polarization direction thereof are adjusted by the half-wave plate 14 and the polarizing plate 16. Then, the light is converted into parallel light of a large diameter by the beam expander 18, and is incident on the axicon optical system 20.

At the axicon optical system 20, as described above, by adjusting the half-wave plate 50 within the axicon optical system 20, it is ideally possible to generate, from the incident circular parallel light, only the ring-shaped parallel light 102 that is to be irradiated on the reference light region 26R. Here, a case in which the signal light recorded in the hologram is reproduced by irradiating the reference light as reading light will be described. In this case, the reference light pattern is displayed on the reference light region 26R of the spatial light modulator 26, and only the ring-shaped parallel light 102 is generated at the axicon optical system 20, and the ring-shaped parallel light 102 is irradiated only onto the reference light region 26R.

Figure 6B:
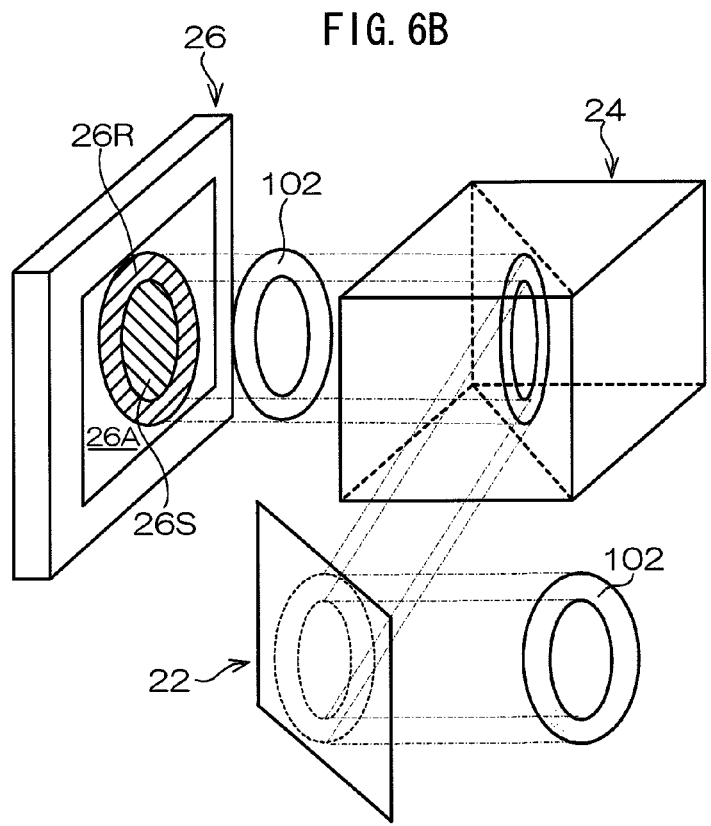
FIG. 6B is a perspective view showing a situation in which laser light is irradiated onto the display surface of the spatial light modulator at a time of reproduction.

As shown in FIG. 6B, the ring-shaped parallel light 102 that exits from the axicon optical system 20 is irradiated onto the reflecting mirror 22. The ring-shaped parallel light 102 reflected by the reflecting mirror 22 is incident on the polarization beam splitter 24. The incident ring-shaped parallel light 102 (S-polarized light) is reflected in the direction toward the spatial light modulator 26 by the polarization beam splitter 24. At this time, the reproduction pattern is displayed at the spatial light modulator 26. At the spatial light modulator 26, the laser light is polarized and modulated in accordance with the displayed pattern (S-polarized light is converted to P-polarized light), and reference light is generated.

In the exemplary embodiment, as shown in FIG. 6B, the ring-shaped parallel light 102 generated at the axicon optical system 20 is irradiated onto the reference light region 26R of the spatial light modulator 26. The laser light incident on the reference light region 26R is polarized and modulated in accordance with the displayed reference light pattern, and reference light is generated. In the same way as in the recording process, the generated reference light is irradiated onto the region of the optical recording medium 36 where the hologram is recorded. Namely, only the reference light is irradiated as reading light onto the optical recording medium 36.

The ring-shaped parallel light 102 is generated in accordance with the shape of the reference light region 26R, and laser light is irradiated only onto the reference light region 26R, and is not irradiated onto the signal light region 26S. Accordingly, the light that is reflected at the signal light region 26S (the leakage light that exists in the region corresponding to the signal light) being irradiated onto the optical recording medium 36 together with the reference light for reading does not happen in theory. Accordingly, the unnecessary leakage light (unnecessary component) generated at the signal light region is greatly reduced from the reading light irradiated onto the hologram, and the reproduction characteristic improves.

When the irradiated reference light is transmitted through the optical recording medium 36, it is diffracted by the hologram, and the transmitted diffraction light (reproduced light) exits toward the Fourier transform lens 38 side of the optical recording medium 36. Some of the reference light is transmitted through the optical recording medium 36 without being diffracted. The reproduced light (including the transmitted reference light) is inverse-Fourier-transformed by the Fourier transform lens 38, and is irradiated onto the light-shielding plate 40 that has the aperture 40A. Of the reproduced light that is inverse-Fourier-transformed at the lens 38, the transmitted reference light is cut at the light-shielding plate 40 and the remainder passes through the aperture 40A. The light that passes through the aperture 40A is relayed by the pair of lenses 42, 44 and is incident on the sensor array 46.

The sensor array 46 converts the received reproduced light into electrical signals, and outputs the electrical signals. Namely, the sensor array 46 captures the reproduced image that is imaged on the light-receiving surface thereof, and outputs the obtained image data (the data that the reproduced signal light holds) to the controller (not shown). At the sensor array 46, oversampling may be carried out in which one pixel of the signal light data is received by plural light-receiving elements. In this case, for example, one bit of data may be received by four (2×2) light-receiving elements.

In a case in which reproduction is carried out by adding the DC component of the signal light at the reproduction process as described above, a reference light pattern is displayed on the reference light region 26R of the spatial light modulator 26, and a transmission pattern is displayed on the signal light region 26S. Then, by adjusting the half-wave plate 50 within the axicon optical system 20, appropriate light amount is distributed to the signal light optical path as the amount of the DC component that should be added, and the circular parallel light 100 to be irradiated onto the signal light region 26S and the ring-shaped parallel light 102 to be irradiated onto the reference light region 26R are generated from the incident circular parallel light. Reference light is generated from the reference light region 26R by irradiating the ring-shaped parallel light 102 thereon. On the other hand, a DC component whose phase and amplitude are adjusted is generated from the signal light region 26S by irradiating the circular parallel light 100 thereon.

Experimental Results

Figure 7A:
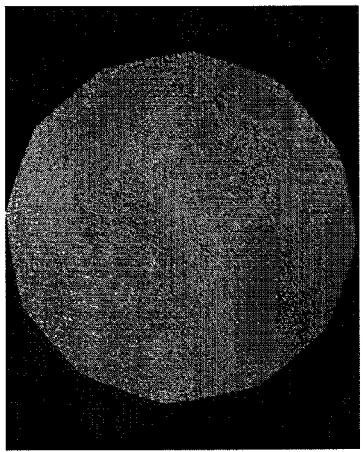
FIGS. 7A through 7D are drawings showing the effects of including the axicon optical system.
Figure 7B:
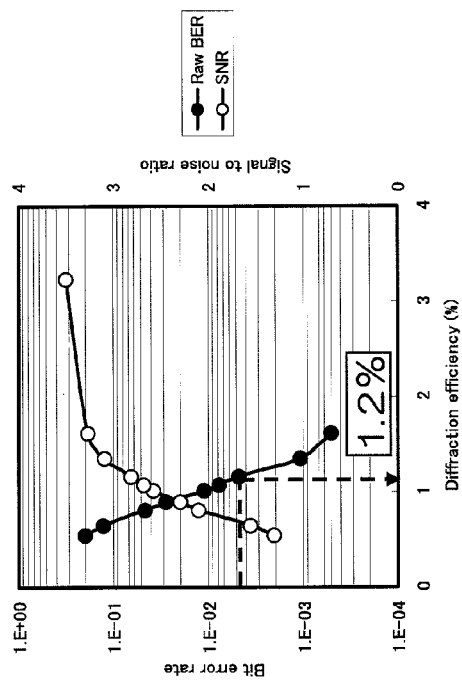

FIGS. 7A through 7D are drawings showing the results of using the axicon optical system. FIG. 7A is a drawing that captures the display surface of a spatial light modulator at the time of irradiating reference light for reading onto the spatial light modulator by using an optical recording/reproduction device having the same structure as the structure illustrated in FIG. 1 (hereinafter called "device including the axicon optical system"). On the other hand, FIG. 7B is a drawing that captures the display surface of a spatial light modulator at the time of irradiating reference light for reading onto the spatial light modulator by using an optical recording/reproduction device having the same structure as the conventional art and in which the axicon optical system is removed from the structure illustrated in FIG. 1 (hereinafter called "conventional device").

In the device including the axicon optical system, reference light intensity that is 10 times that of the conventional device is obtained. This is due to the light amount adjusting unit (the half-wave plate 50) distributing light only to the reference light region of the spatial light modulator in reproduction process. Accordingly, 10 times the reference light energy (10 μJ (microjoules)) is inputted to the display surface shown in FIG. 7A, as compared with the display surface shown in FIG. 7B. It can be understood that, regardless of this fact, the leakage light of the signal light region is greatly reduced at the display surface shown in FIG. 7A, as compared with the display surface shown in FIG. 7B. This is due to the structure in which light is not irradiated onto the signal light region of the spatial light modulator in the reproduction process.

Figure 7C:
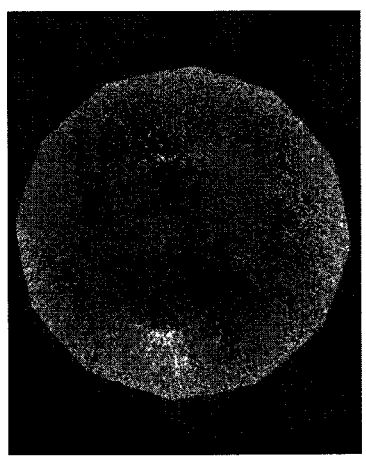
Figure 7D:
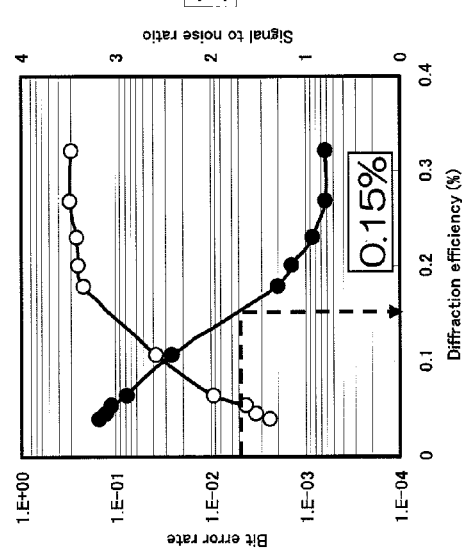

FIG. 7C is a graph showing the results of evaluating the "lowest diffraction efficiency" of reproduction process at the device including the axicon optical system. On the other hand, FIG. 7D is a graph showing the results of evaluating the "lowest diffraction efficiency" of reproduction process at the conventional device. The diffraction efficiency of the hologram is varied by changing the recording energy, and the reproduction characteristic is evaluated. The diffraction efficiency (unit: %) is shown on the horizontal axis, the signal/noise ratio (SNR) is shown on the vertical axis at the right side, and the bit error rate (BER) is shown on the vertical axis at the left side. Note that the bit error rate is noted exponentially. For example, "1.E-02" means $1 \times 10^{-2}$. The greater the value of the SNR and the lower the value of the BER, the better the reproduction characteristic.

In this case, the diffraction efficiency when the BER is $5 \times 10^{-3}$ is the lowest diffraction efficiency at which reproduction is possible. The smaller the value of the lowest diffraction efficiency, the more a low diffraction efficiency hologram can be reproduced at a good SNR, and the better the reproduction characteristic. Namely, because the recording energy of the hologram to be recorded can be lowered, more holograms can be multiple-recorded, which contributes to an improvement in the recording density. As shown in FIGS. 7C and 7D, the lowest diffraction efficiency in the reproduction process by the device including the axicon optical system is 0.15%, and the lowest diffraction efficiency in the reproduction process by the conventional device is 1.2%. It can be understood that, by using the axicon optical system, the lowest diffraction efficiency decreases from 1.2% to 0.15%, and the reproduction characteristic is markedly improved. Because the number of holograms that can be multiple-recorded is inversely proportional to the square root of the diffraction efficiency, this corresponds to an improvement in recording density of about 2.8 times.

Second Exemplary Embodiment

A second exemplary embodiment is an example in which the structure of the axicon optical system 20 is changed such that the signal light optical path is bent instead of the reference light optical path. Other than the structure of the axicon optical system 20, the structures are the same as those of the optical recording/reproduction device relating to the first exemplary embodiment shown in FIG. 1. Therefore, structural portions that are the same are denoted by the same reference numerals, and description thereof is omitted. Hereinafter, only the structure and operation of the axicon optical system 20 relating to the second exemplary embodiment will be described.

Figure 8:
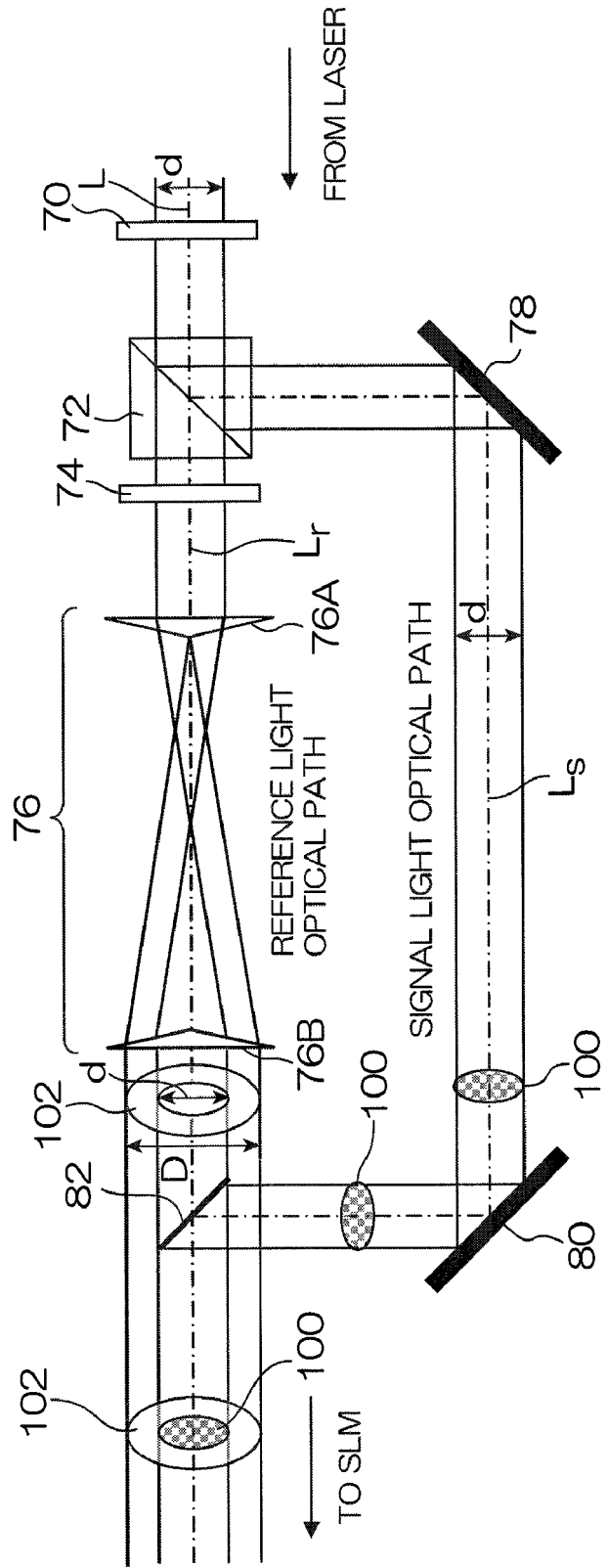
FIG. 8 is a schematic view showing the structure of an axicon optical system relating to a second exemplary embodiment.

FIG. 8 is a schematic view showing the structure of the axicon optical system 20 relating to the second exemplary embodiment. The axicon optical system 20 is structured to include a half-wave plate 70, a polarization beam splitter 72, a half-wave plate 74, a pair of axicon lenses 76 that convert a circular beam into a ring-shaped beam, a reflecting mirror 78, a reflecting mirror 80, and an elliptical reflecting mirror 82. The half-wave plate 70 and the polarization beam splitter 72 are disposed in that order along the optical path in a laser light incident direction.

The polarization beam splitter 72 distributes the incident laser light to a signal light optical path and a reference light optical path. The half-wave plate 74 and the pair of axicon lenses 76 are disposed in that order along the optical path at the light transmitting side of the polarization beam splitter 72 (i.e., at the reference light optical path). On the other hand, the reflecting mirror 78 is disposed at the light reflecting side of the polarization beam splitter 72 (i.e., at the signal light optical path). The other one reflecting mirror 80 is disposed at the light reflecting side of the reflecting mirror 78. The elliptical reflecting mirror 82 is disposed at the light reflecting side of the reflecting mirror 80. As will be described later, the elliptical reflecting mirror 82 functions as an optical axis aligning unit that reflects the circular parallel light 100 generated at the signal light optical path and aligns the optical axis thereof with that of the ring-shaped parallel light 102 generated at the reference light optical path.

Operation of the axicon optical system 20 shown in FIG. 8 will be described next. Circular parallel light of the diameter d and whose optical axis is L is incident on the axicon optical system 20 from the beam expander 18. At the half-wave plate 70, the circular parallel light of the diameter d becomes polarized light having a desired polarization plane, and is incident on the polarization beam splitter 72. The polarized component that is transmitted through the polarization beam splitter 72 is distributed to the reference light optical path as circular parallel light of the diameter d. The polarized component that is reflected at the polarization beam splitter 72 is distributed to the signal light optical path as circular parallel light of the diameter d.

The light intensity ratio (light amount balance) of the light distributed to the signal light optical path and the light distributed to the reference light optical path can be adjusted by adjusting the half-wave plate 70. In the exemplary embodiment, by adjusting the half-wave plate 70, light is distributed to both the signal light optical path and the reference light optical path in recording process, and light is distributed only to the reference light optical path in reproduction process. Accordingly, in the reproduction process, only the ring-shaped parallel light 102 is generated at the reference light optical path, and the generated ring-shaped parallel light 102 is irradiated onto only the reference light region 26R of the spatial light modulator 26 shown in FIG. 5B. Namely, light is not irradiated onto the signal light region 26S shown in FIG. 5B.

In this way, in the same way as in the first exemplary embodiment, in the reading light irradiated onto the hologram, the unnecessary leakage light (unnecessary component) generated at the signal light region is greatly reduced, and the reproduction characteristic is improved. Further, in reproduction process, the laser power from the light source is used only in generating reference light, and therefore, the efficiency of light utilization in the reproduction process is improved.

Further, as in the same way as in the first exemplary embodiment, when reproduction is carried out by adding the DC component of the signal light, such as in the aforementioned "coherent addition method" or "negative/positive reproduction method", the half-wave plate 70 can be adjusted such that an appropriate light amount is distributed to the signal light optical path as the amount of the DC component that should be added.

The polarized component transmitted through the polarization beam splitter 72 is distributed to the reference light optical path as described above. At the circular parallel light of the diameter d that is distributed to the reference light optical path, a phase difference of ½ wavelength is again provided by the half-wave plate 74 to the orthogonal linearly polarized components, such that the polarization direction thereof is adjusted to become the same as that of the signal light. The parallel light that exits from the half-wave plate 74 is incident on an axicon lens 76A. The circular parallel light of the diameter d that is incident from the flat surface of the axicon lens 76A is collected into a ring-shape by the axicon lens 76A, and is made into parallel light by an axicon lens 76B. The ring-shaped parallel light 102, whose outer diameter is D and whose inner diameter is d, exits from the flat surface of the axicon lens 76B.

On the other hand, the polarized component that is reflected at the polarization beam splitter 72 is distributed to the signal light optical path as described above. The circular parallel light of the diameter d distributed to the signal light optical path is guided through the signal light optical path at the uniform diameter d. The circular parallel light 100 distributed to the signal light optical path is reflected at the reflecting mirror 78 such that the optical path thereof is bent, and is irradiated onto the reflecting mirror 80. The circular parallel light 100 irradiated onto the reflecting mirror 80 is reflected at the reflecting mirror 80 such that the optical path thereof is bent in the direction of the reference light optical path, and is irradiated onto the elliptical reflecting mirror 82.

Figure 9:
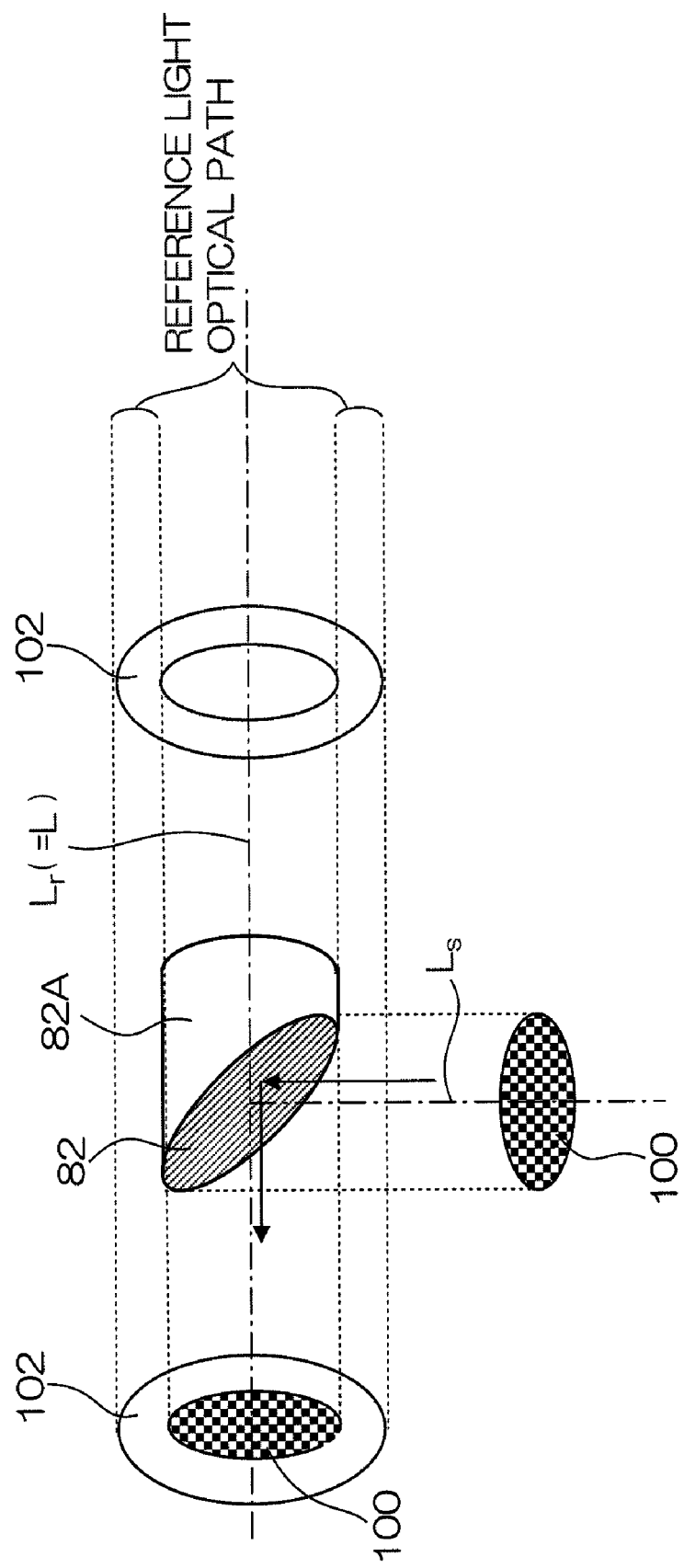
FIG. 9 is a drawing showing that an elliptical reflecting mirror functions as an optical axis aligning unit.

As shown in FIG. 9, the elliptical reflecting mirror 82 is disposed at the inside of the reference light optical path. Further, the elliptical reflecting mirror 82 is disposed so as to be inclined at a predetermined angle (here, 45°) with respect to the optical axis $L_r$ of the ring-shaped parallel light 102 generated at the reference light optical path, such that the optical axis $L_r$ and the optical axis $L_s$ of the circular parallel light 100 generated at the signal light optical path coincide. Due to this configuration, the circular parallel light 100 generated at the signal light optical path is reflected at the elliptical reflecting mirror 82, and the optical path thereof is again bent (90° here), and the optical axis is made to coincide with that of the ring-shaped parallel light 102 generated at the reference light optical path.

The elliptical reflecting mirror 82 may be, for example, as shown in FIG. 9, a structure in which a circular-tube-shaped rod having a circular floor surface of the diameter d is cut so as to form a cross-section that is inclined by 45° with respect to the bottom surface, and aluminum or the like may be vapor-deposited on the exposed cross-section to form a reflecting film. Or, the elliptical reflecting mirror 82 may be a structure in which a reflecting film is formed on an elliptical substrate formed from a plate-shaped glass or the like, or may be a structure in which a flat-plate-shaped reflecting plate is machined into an elliptical shape.

As described above, in the same way as in the first exemplary embodiment, the axicon optical system 20 relating to the second exemplary embodiment distributes the incident circular parallel light to the signal light optical path and the reference light optical path, the circular parallel light 100 is generated at the signal light optical path, and the ring-shaped parallel light 102 is generated at the reference light optical path. Further, the circular parallel light 100 generated at the signal light optical path and the ring-shaped parallel light 102 generated at the reference light optical path are aligned such that the optical axes thereof coincide. The circular parallel light 100 and the ring-shaped parallel light 102, whose optical axes coincide, exit from the axicon optical system 20.

As described above, the parallel light that exits from the axicon optical system 20 is reflected at the reflecting mirror 22 and at the polarization beam splitter 24, and is irradiated onto the spatial light modulator 26. At this time, the circular parallel light 100 generated at the signal light optical path is irradiated onto the signal light region 26S, and the ring-shaped parallel light 102 generated at the reference light optical path is irradiated onto the reference light region 26R (refer to FIG. 6A).

Modified Example 1

Figure 10:
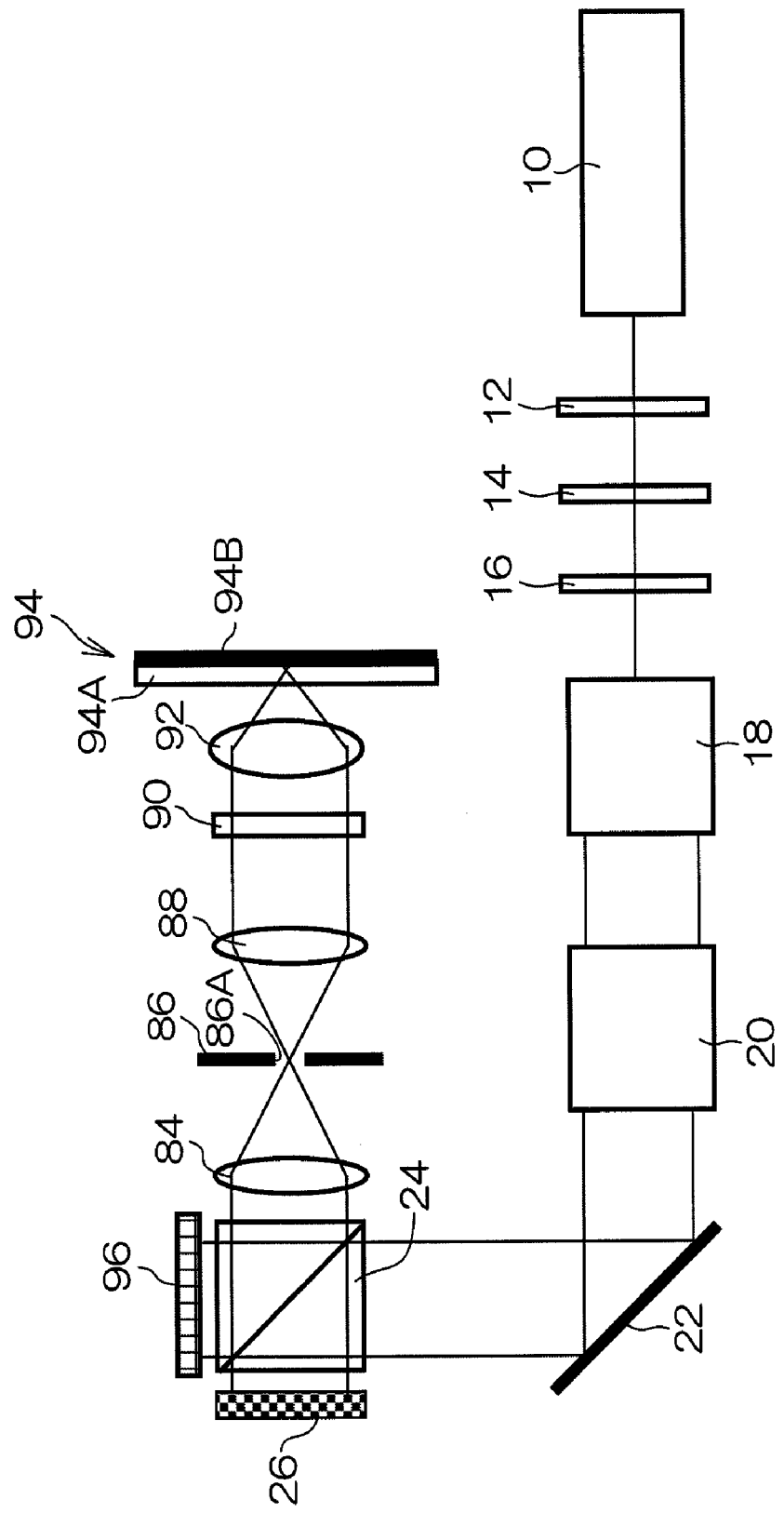
FIG. 10 is a schematic view showing the structure of a coaxial-reflection-type optical recording/reproduction device in which an axicon optical system is included.

The above exemplary embodiments describe examples of a "coaxial transmission-type" optical recording/reproduction device that uses a reflection-type spatial light modulator and a transmission-type optical recording medium. However, effects that are similar to those of the above-described exemplary embodiments can be obtained also when the axicon optical system is included in a "coaxial reflection-type" optical recording/reproduction device that uses a reflection-type spatial light modulator and a reflection-type optical recording medium. FIG. 10 is a schematic view showing the structure of a coaxial reflection-type optical recording/reproduction device including the axicon optical system. Structural portions that are the same as those of the optical recording/reproduction device relating to the first exemplary embodiment shown in FIG. 1 are denoted by the same reference numerals, and description thereof is simplified.

The light source 10 that emits laser light is provided at the optical recording/reproduction device. The shutter 12, the half-wave plate 14, the polarizing plate 16, the beam expander 18, the axicon optical system 20 and the reflecting mirror 22 are disposed in that order along the optical path from the light source 10 at the light exiting side of the light source 10. The polarization beam splitter 24 is disposed at the light reflecting side of the reflecting mirror 22. The reflection-type spatial light modulator 26 is disposed at the light reflecting side of the polarization beam splitter 24, as seen from the reflecting mirror 22. The spatial light modulator 26 modulates incident laser light in accordance with a displayed signal light pattern and reference light pattern, and generates signal light and reference light. In the case of carrying out reproduction by adding a DC component, the spatial light modulator 26 generates the DC component to be added. The spatial light modulator 26 reflects the generated signal light, reference light and the like toward the polarization beam splitter 24.

As described above, the axicon optical system 20 generates, separately and in accordance with the shapes of the respective regions, parallel light to be irradiated onto the signal light region 26S and parallel light to be irradiated onto the reference light region 26R. Also, the light amount can be adjusted per region. The axicon optical system 20 may have the same structure as that of the first exemplary embodiment, or may have the same structure as that of the second exemplary embodiment.

The signal light and the reference light and the like that are generated at the spatial light modulator 26 are incident on the polarization beam splitter 24. A pair of lenses 84, 88, a quarter-wave plate 90 that converts linearly polarized light into circularly polarized light and converts circularly polarized light into linearly polarized light, and a Fourier transform lens 92 are disposed in that order along the optical path at the light transmitting side of the polarization beam splitter 24, as seen form the spatial light modulator 26. The Fourier transform lens 92 irradiates recording light onto a reflection-type optical recording medium 94. The focal position of the Fourier transform lens 92 is the light collecting position at which the recording light is collected. Further, a light-shielding plate 86 having an opening (aperture) 86A is disposed in a vicinity of the beam waist, between the lens 84 and the lens 88. Note that the light-shielding plate 86 is not essential, and can be appropriately omitted.

A holding stage (not shown) that holds the optical recording medium 94 is provided at the light exiting side of the Fourier transform lens 92. The optical recording medium 94 is an optical recording medium that can record a hologram by changes in the refractive index due to the irradiation of light. The optical recording medium 94 has a recording layer 94A structured by a recording material that can record a hologram such as a photopolymer material, and a reflecting layer 94B structured by a metal film or the like that reflects the light transmitted through the recording layer 94A.

A sensor array 96 is disposed at the light reflecting side of the polarization beam splitter 24 as seen from the lens 84. The sensor array 96 is structured by image capturing elements such as a CCD or CMOS array, and converts the reproduced light (diffraction light) that is received into electrical signals and outputs the electrical signals.

In the case of a recording a hologram, the shutter 12 is opened and laser light is emitted from the light source 10. Simultaneously, a recording pattern is displayed on the spatial light modulator 26. The laser light emitted from the light source 10 passes through the shutter 12, and the light intensity and polarization direction thereof are adjusted by the half-wave plate 14 and the polarizing plate 16. The light that is transmitted through the polarizing plate 16 is converted into parallel light of a large diameter by the beam expander 18, and is made incident on the axicon optical system 20.

At the axicon optical system 20, the incident circular parallel light is distributed to the signal light optical path and the reference light optical path, and the circular parallel light 100 to be irradiated onto the signal light region 26S is generated at the signal light optical path, and the ring-shaped parallel light 102 to be irradiated onto the reference light region 26R is generated at the reference light optical path. The circular parallel light 100 generated at the signal light optical path and the ring-shaped parallel light 102 generated at the reference light optical path are aligned such that the optical axes thereof coincide. Then, the circular parallel light 100 and the ring-shaped parallel light 102 having a common optical axis exit from the axicon optical system 20.

The parallel light that exits from the axicon optical system 20 is irradiated onto the reflecting mirror 22. The parallel light reflected at the reflecting mirror 22 is incident on the polarization beam splitter 24. The incident parallel light is reflected in the direction toward the spatial light modulator 26 by the polarization beam splitter 24. At the spatial light modulator 26, the laser light is polarized and modulated in accordance with the displayed recording pattern, and signal light and reference light are generated.

The recording light that is polarized and modulated at the spatial light modulator 26 is irradiated onto the polarization beam splitter 24, and is transmitted through the polarization beam splitter 24 and converted into an amplitude distribution of linearly polarized light. Thereafter, the light is collected at the lens 84, and is irradiated onto the light-shielding plate 86 having the aperture 86A. The unnecessary frequency component of the recording light collected at the lens 84 is cut at the light-shielding plate 86, and the remainder passes through the aperture 86A. The recording light that passes through the aperture 86A is converted into parallel light by the lens 88.

The recording light (signal light and reference light), that is converted into parallel light by the lens 88, is converted into circularly polarized light by the quarter-wave plate 90, is Fourier-transformed and collected by the Fourier transform lens 92, and is irradiated simultaneously and coaxially onto the optical recording medium 94. At the position where the signal light and the reference light are collected, the interference fringes formed by the signal light and the reference light interfering are recorded as a hologram on the optical recording medium 94.

In a case of reading the data recorded on the optical recording medium 94, the shutter 12 is opened, and laser light is emitted from the light source 10. Simultaneously, a reproduction pattern is displayed on the spatial light modulator 26. In the same way as in the case of recording, the laser light emitted from the light source 10 passes through the shutter 12, and the light intensity and polarization direction thereof are adjusted by the half-wave plate 14 and the polarizing plate 16. Then, the light is converted into parallel light of a large diameter by the beam expander 18, and is incident on the axicon optical system 20.

As described above in the first exemplary embodiment, at the axicon optical system 20, by adjusting the half-wave plate 50 within the axicon optical system 20, it is possible to generate, from the incident circular parallel light, only the ring-shaped parallel light 102 to be irradiated on the reference light region 26R. Further, in a case in which reproduction is carried out by adding a DC component, the half-wave plate 50 can be adjusted such that only the appropriate light amount is irradiated onto the signal light region 26S of the spatial light modulator 26. An example of a case in which only the ring-shaped parallel light 102 exits from the axicon optical system 20 will be described hereinafter.

The ring-shaped parallel light 102 that exits from the axicon optical system 20 is irradiated onto the reflecting mirror 22. The ring-shaped parallel light 102 reflected at the reflecting mirror 22 is incident on the polarization beam splitter 24. The incident ring-shaped parallel light 102 is reflected in the direction toward the spatial light modulator 26 by the polarization beam splitter 24. At the spatial light modulator 26, the laser light is polarized and modulated in accordance with the displayed reproduction pattern, and reference light is generated. In the same way as in the case of recording, the generated reference light is irradiated onto the region of the optical recording medium 94 where the hologram is recorded. Namely, only the reference light is irradiated as reading light onto the optical recording medium 94.

The ring-shaped parallel light 102 is generated in accordance with the shape of the reference light region 26R, and laser light is irradiated only onto the reference light region 26R, and is not irradiated onto the signal light region 26S. Accordingly, from the standpoint of design, the light reflected at the signal light region 26S (the leakage light that exists in the region corresponding to the signal light) being irradiated onto the optical recording medium 94 together with the reference light for reading does not occur. Due to this configuration, the unnecessary leakage light (unnecessary component) generated at the signal light region from the reading light that is irradiated onto the hologram is greatly reduced, and the reproduction characteristic improves.

When the irradiated reference light is transmitted through the recording layer 94A of the optical recording medium 94, the light is diffracted by the hologram, reflected at the reflecting layer 94B, and the reflected diffraction light (reproduced light) exits toward the Fourier transform lens 92. A portion of the reference light is reflected at the reflecting layer 94B of the optical recording medium 94 without being diffracted. The reproduced light (including the reflected reference light) is inverse-Fourier-transformed by the Fourier transform lens 92, and is again converted into linearly polarized light by the quarter-wave plate 90. The reproduced light converted into linearly polarized light by the quarter-wave plate 90, is relayed and converted into parallel light by the pair of lenses 88, 84, and is incident on the polarization beam splitter 24, reflected at the polarization beam splitter 24, and incident on the sensor array 96. The sensor array 96 captures the reproduced image imaged at the light-receiving surface, and outputs the obtained image data to the controller (not shown).

Modified Example 2

Note that the above exemplary embodiments describe examples of using the axicon optical system as an optical system that includes a light distribution unit, a beam shaping unit, and an optical axis aligning unit. However, it suffices that the optical system generates, in reproduction process, separately and in accordance with the respective regions, laser light to be irradiated onto the signal light region of a spatial light modulator and laser light to be irradiated onto the reference light region. By including such an optical system, for example, at the time of usual reproduction in which reference light is irradiated as reading light, it can be made such that the laser light is irradiated onto only the reference light region and laser light is not irradiated onto the signal light region of the spatial light modulator. Further, for example, in a case of adding the DC component of the signal light in reproduction process, laser light of a desired light amount can be irradiated onto the signal light region of the spatial light modulator.

Figure 11A:
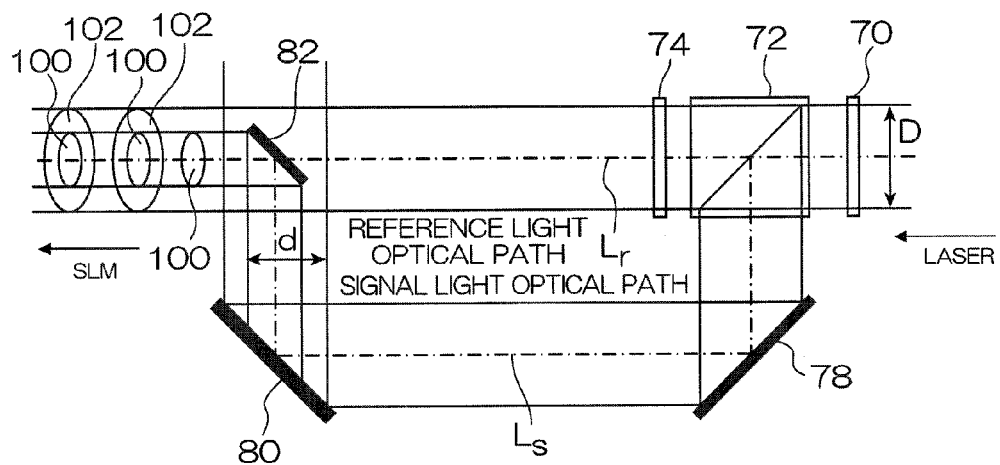
FIG. 11A and FIG. 11B are drawings showing other structural examples of an optical system.
Figure 11B:
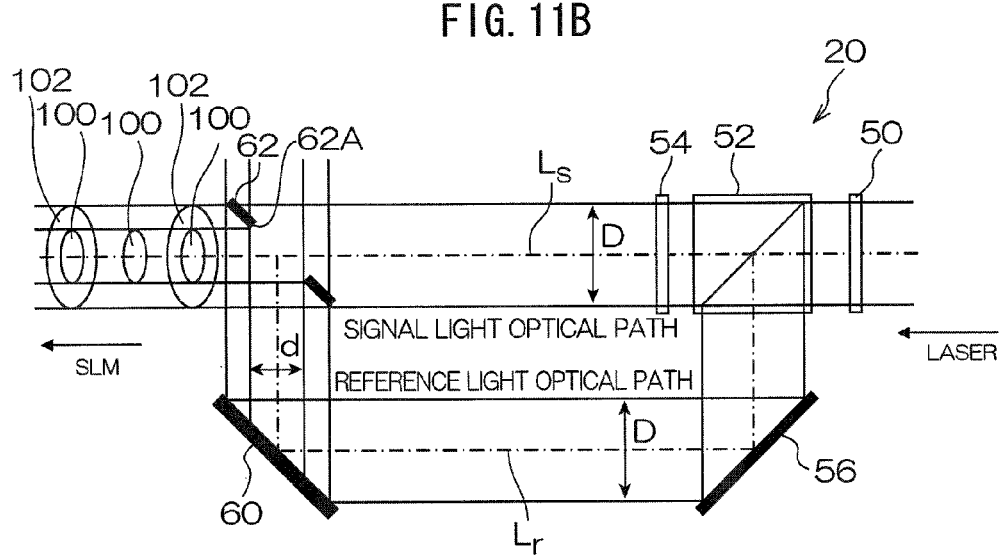

FIGS. 11A and 11B are drawings showing other structural examples of the above-described optical system. The structure shown in FIG. 11A is the same structure as the optical system shown in FIG. 8, except that the pair of axicon lenses 76 are removed. Therefore, structural portions that are the same as in FIG. 8 are denoted by the same reference numerals, and description thereof is omitted. In the structure shown in FIG. 11A, circular parallel light of the diameter D and whose optical axis is L is incident from the beam expander 18. This circular parallel light of the diameter D becomes polarized light having a desired polarization plane due to the half-wave plate 70, and is incident on the polarization beam splitter 72.

The polarized component transmitted through the polarization beam splitter 72 is distributed to the reference light optical path as circular parallel light of the diameter D. The polarized component reflected at the polarization beam splitter 72 is distributed to the signal light optical path as circular parallel light of the diameter D. At the circular parallel light distributed to the reference light optical path, a phase difference of ½ wavelength is provided by the half-wave plate 74 to the orthogonal linearly polarized components, such that the polarization direction thereof is adjusted to become the same as that of the signal light, and the resultant light exits from the half-wave plate 74. The light from the half-wave plate 74 is irradiated onto the elliptical reflecting mirror 82, and a portion thereof is blocked at the elliptical reflecting mirror 82, and the remainder passes through the periphery of the elliptical reflecting mirror 82. Due to this configuration, the ring-shaped parallel light 102 of the outer diameter D and the inner diameter d is generated at the reference light optical path.

On the other hand, the polarized component reflected at the polarization beam splitter 72 is distributed to the signal light optical path as described above. The circular parallel light of the diameter D distributed to the signal light optical path is guided through the signal light optical path at the uniform diameter D. The circular parallel light distributed to the signal light optical path is reflected at the reflecting mirror 78 such that the optical path thereof is bent, and is irradiated onto the reflecting mirror 80. The circular parallel light irradiated onto the reflecting mirror 80, is reflected at the reflecting mirror 80 such that the optical path thereof is bent toward the direction of the reference light optical path, and is irradiated onto the elliptical reflecting mirror 82. A portion of the circular parallel light distributed to the signal light optical path is reflected at the elliptical reflecting mirror 82 in order to bent the optical path thereof again such that the optical axis thereof coincides with that of the ring-shaped parallel light 102 generated at the reference light optical path, and the circular parallel light 100 of the diameter d is generated. The remainder passes through the periphery of the elliptical reflecting mirror 82.

The structure shown in FIG. 11B is the same structure as the optical system shown in FIG. 2, except that the pair of axicon lenses 58 are removed. Therefore, structural portions that are the same as in FIG. 2 are denoted by the same reference numerals, and description thereof is omitted. In the structure shown in FIG. 11B, circular parallel light of the diameter D is incident from the beam expander 18. This circular parallel light of the diameter D becomes polarized light having a desired polarization plane due to the half-wave plate 50, and is incident on the polarization beam splitter 52. The polarization beam splitter 52 reflects light of a predetermined polarization direction, and transmits light of the polarization direction orthogonal thereto.

The polarized component transmitted through the polarization beam splitter 52 is distributed to the signal light optical path as circular parallel light of the diameter D. The polarized component reflected at the polarization beam splitter 52 is distributed to the reference light optical path as circular parallel light of the diameter D. At the circular parallel light of the diameter D distributed to the signal light optical path, a phase difference of ½ wavelength is provided by the half-wave plate 54 to the orthogonal linearly polarized components, and the polarization direction thereof is adjusted to become the same as that of the signal light. The circular parallel light, whose polarization direction is adjusted, is guided through the signal light optical path at the uniform diameter D. A portion of the circular parallel light of the diameter D, that is distributed to the signal light optical path, passes through the opening 62A of the reflecting mirror 62 and becomes the circular parallel light 100 of the diameter d. The remainder of the parallel light distributed to the signal light optical path is blocked at the elliptical-ring-shaped reflecting mirror 62.

On the other hand, the polarized component reflected at the polarization beam splitter 52 is distributed to the reference light optical path as described above. The circular parallel light of the diameter D distributed to the reference light optical path is reflected at the reflecting mirror 56 and the reflecting mirror 60 such that the optical path thereof is bent in the direction toward the signal light optical path, and is irradiated onto the elliptical-ring-shaped reflecting mirror 62. A portion of the circular parallel light irradiated onto the elliptical-ring-shaped reflecting mirror 62, is reflected at the elliptical-ring-shaped reflecting mirror 62 in order to bent the optical path thereof again such that the optical axis thereof coincides with that of the circular parallel light 100 generated at the signal light optical path, and the ring-shaped parallel light 102 of the outer diameter D and the inner diameter d is generated. The remainder of the parallel light distributed to the reference light optical path passes through the opening 62A of the reflecting mirror 62.

The optical systems illustrated in FIGS. 11A and 11B do not use axicon lenses. As compared with a case in which axicon lenses are used, the light utilization efficiency decreases, but finely precise alignment of the respective optical elements is unnecessary, and the circular parallel light 100 and the ring-shaped parallel light 102 can be generated by a simpler structure. Note that the elliptical reflecting mirror 82 in FIG. 11A and the elliptical-ring-shaped reflecting mirror 62 in FIG. 11B function as the "optical axis aligning unit", and at the same time also function as the "beam shaping unit".

Modified Example 3

Further, in the above-described exemplary embodiments, by placing the half-wave plate at the upstream side of the polarization beam splitter in the axicon optical system, the half-wave plate is made to function as the "light amount adjusting unit" that adjusts the light amount balance of the two distributed light beams. However, a liquid crystal element or the like can be used instead of the half-wave plate. In the case of using a liquid crystal element, there are advantages from the standpoints of high-speed control, a compact structure, and cost, as compared with a case using a half-wave plate. Further, any of various known means can be used as the "light amount adjusting unit". An example thereof includes an Neutral Density (ND) filter.

The foregoing description of the exemplary embodiments has been provided for the purpose of illustration and description. It is not intended to be exhaustive or to limit the invention to the precise form disclosed herein. Obviously, many modifications and variations will be apparent to a practitioner skilled in the art. The exemplary embodiments were chosen and described in order to best explain the principles of the invention and its practical applications, thereby enabling others skilled in the art to understand the invention according to various embodiments and with various modifications as are suited to the particular use contemplated. It is intended that the scope of the invention be defined by the following claims and their equivalents.

What is claimed is:

1. An optical reproduction device that reproduces a hologram which is recorded on an optical recording medium by interference between a signal light and a reference light coaxial to the signal light, the device comprising:
    a light source that emits coherent light;
    a light distribution unit that distributes the coherent light emitted from the light source to a signal light optical path and a reference light optical path;
    a spatial light modulator comprising a plurality of pixels arrayed two-dimensionally, a signal light region that displays a signal light pattern when generating signal light, and a reference light region that displays a reference light pattern when generating reference light coaxial to the signal light, the spatial light modulator modulating and outputting incident light for each pixel in accordance with a displayed pattern;
    a first irradiation optical system that spatially separates light distributed to the reference light optical path and light distributed to the signal light optical path, makes optical axes of both lights coincide, and irradiates both lights onto the spatial light modulator; and
    a second irradiation optical system that irradiates the reference light generated at the reference light region of the spatial light modulator onto the optical recording medium as a reading light, and reproduces signal light that is recorded in the hologram.

2. The optical reproduction device of claim 1, wherein the first irradiation optical system comprises:
    a beam shaping unit disposed on the reference light optical path that shapes an incident beam such that a region through which the light distributed to the signal light optical path passes, and a region through which the light distributed to the reference light optical path passes, are spatially separated within a plane orthogonal to the optical axes that are made to coincide;
    an optical axis aligning unit that aligns an optical axis of the light distributed to the signal light optical path and an optical axis the of light distributed to the reference light optical path and shaped by the beam shaping unit, such that they coincide; and
    a light irradiation unit that irradiates the light distributed to the signal light optical path onto the signal light region, and irradiates the light distributed to the reference light optical path and shaped by the beam shaping unit onto the reference light region.

3. The optical reproduction device of claim 1, further comprising at least one light amount adjusting unit that is disposed at a light incident side or a light exiting side of the light distribution unit, and that adjusts a light amount balance between the two distributed light beams.

4. The optical reproduction device of claim 2, wherein the reference light region surrounds the signal light region, and the beam shaping unit comprises a pair of axicon lenses that are disposed at the reference light optical path such that conical surfaces thereof oppose one another.

5. The optical reproduction device of claim 4, wherein the pair of axicon lenses shape an incident beam such that it is irradiated only on the reference light region.

6. An optical recording/reproduction device that records and reproduces a hologram with respect to an optical recording medium, the device comprising:
    a light source that emits coherent light;
    a light distribution unit that distributes the coherent light emitted from the light source to a signal light optical path and a reference light optical path;
    a spatial light modulator comprising a plurality of pixels arrayed two-dimensionally, a signal light region that displays a signal light pattern when generating signal light, and a reference light region that displays a reference light pattern when generating reference light coaxial to the signal light, the spatial light modulator modulating and outputting incident light for each pixel in accordance with a displayed pattern;

a first irradiation optical system that spatially separates light distributed to the reference light optical path and light distributed to the signal light optical path, makes optical axes of both lights coincide, and irradiates both lights onto the spatial light modulator; and a second irradiation optical system that, at a time of recording, irradiates signal light generated at the spatial light modulator and reference light coaxial to the signal light onto an optical recording medium, and records a hologram on the optical recording medium by interference between the signal light and the reference light, and, at a time of reproduction, irradiates reference light generated at the reference light region of the spatial light modulator, as reading light onto the optical recording medium on which the hologram is recorded, and reproduces signal light which is recorded in the hologram.

7. The optical recording/reproduction device of claim 6, wherein the first irradiation optical system comprises:

a beam shaping unit disposed on the reference light optical path that shapes an incident beam such that a region through which the light distributed to the signal light optical path passes, and a region through which the light distributed to the reference light optical path passes, are spatially separated within a plane orthogonal to the optical axes which are made to coincide;

an optical axis aligning unit that aligns an optical axis of the light distributed to the signal light optical path, and an optical axis of the light distributed to the reference light optical path and shaped by the beam shaping unit, such that they coincide; and a light irradiation unit that irradiates the light distributed to the signal light optical path onto the signal light region, and irradiates the light distributed to the reference light optical path and shaped by the beam shaping unit onto the reference light region.

8. The optical recording/reproduction device of claim 6, further comprising at least one light amount adjusting unit that is disposed at a light incident side or a light exiting side of the light distribution unit, and that adjusts a light amount balance between the two distributed light beams.

9. The optical recording/reproduction device of claim 7, wherein the reference light region is disposed so as to surround the signal light region, and the beam shaping unit includes a pair of axicon lenses that are disposed at the reference light optical path such that conical surfaces thereof oppose one another.

10. The optical recording/reproduction device of claim 9, wherein the pair of axicon lenses shape an incident beam such that it is irradiated only on the reference light region.

11. An optical reproduction method comprising:

preparing a spatial light modulator comprising a plurality of pixels arrayed two-dimensionally, a signal light region that displays a signal light pattern when generating signal light, and a reference light region that displays a reference light pattern when generating reference light coaxial to the signal light, the spatial light modulator modulating and outputting incident light for each pixel in accordance with a displayed pattern;

distributing coherent light emitted from a light source to a signal light optical path and a reference light optical path;

spatially separating light distributed to the reference light optical path and light distributed to the signal light optical path, aligning optical axes of both lights to coincide, and irradiating both lights onto the spatial light modulator; and irradiating reference light generated at the reference light region of the spatial light modulator, as a reading light onto an optical recording medium on which a hologram is recorded by interference between signal light and reference light coaxial to the signal light, and reproducing signal light that is recorded in the hologram.

* * * * *